(12) United States Patent
Karakas

(10) Patent No.: US 10,726,087 B2
(45) Date of Patent: *Jul. 28, 2020

(54) MACHINE LEARNING SYSTEM AND METHOD TO IDENTIFY AND CONNECT LIKE-MINDED USERS

(71) Applicant: Introduce.social Inc., Palo Alto, CA (US)

(72) Inventor: Ahmet Karakas, Palo Alto, CA (US)

(73) Assignee: shallow.AI Inc., Los Altos, CA (US)

(*) Notice: Subject to any disclaimer, the term of this patent is extended or adjusted under 35 U.S.C. 154(b) by 188 days.

This patent is subject to a terminal disclaimer.

(21) Appl. No.: 15/612,546

(22) Filed: Jun. 2, 2017

(65) Prior Publication Data

US 2017/0351769 A1 Dec. 7, 2017

Related U.S. Application Data

(60) Provisional application No. 62/344,938, filed on Jun. 2, 2016, provisional application No. 62/344,946, filed on Jun. 2, 2016.

(51) Int. Cl.
| | |
|---|---|
| *G06F 16/00* | (2019.01) |
| *G06F 16/9535* | (2019.01) |
| *G06F 16/958* | (2019.01) |
| *G06F 16/901* | (2019.01) |

(52) U.S. Cl.
CPC ...... *G06F 16/9535* (2019.01); *G06F 16/9024* (2019.01); *G06F 16/958* (2019.01)

(58) Field of Classification Search
CPC ............... G06F 16/9535; G06F 16/958; G06F 16/9024; G06F 17/30241; G06F 17/3087; G06F 17/30321; G06F 17/30333; G06F 17/30607; G06Q 50/01
See application file for complete search history.

(56) References Cited

U.S. PATENT DOCUMENTS

| | | | | |
|---|---|---|---|---|
| 8,775,517 | B1* | 7/2014 | Goldman | G06Q 50/01 |
| | | | | 709/204 |
| 8,788,541 | B1* | 7/2014 | Goldman | G06Q 50/01 |
| | | | | 707/802 |
| 9,026,524 | B1 | 5/2015 | Goldman et al. | |
| 9,811,866 | B1* | 11/2017 | Goldman | G06Q 50/01 |
| 2012/0215865 | A1 | 8/2012 | Sack et al. | |
| 2013/0159519 | A1 | 6/2013 | Hochberg et al. | |
| 2014/0279034 | A1* | 9/2014 | Samuel | H04L 67/22 |
| | | | | 705/14.64 |
| 2017/0185601 | A1* | 6/2017 | Qin | G06F 16/24578 |

OTHER PUBLICATIONS

International Search Report, PCT Application PCT/US2017/035834, dated Sep. 17, 2017, 3 pages.

* cited by examiner

*Primary Examiner* — Belix M Ortiz Ditren
*Assistant Examiner* — Suman Rajaputra
(74) *Attorney, Agent, or Firm* — Aka Chan LLP

(57) ABSTRACT

A system and method for a platform identifies and connects like-minded individuals based on interaction. An implementation of the platform is a mobile application.

15 Claims, 31 Drawing Sheets

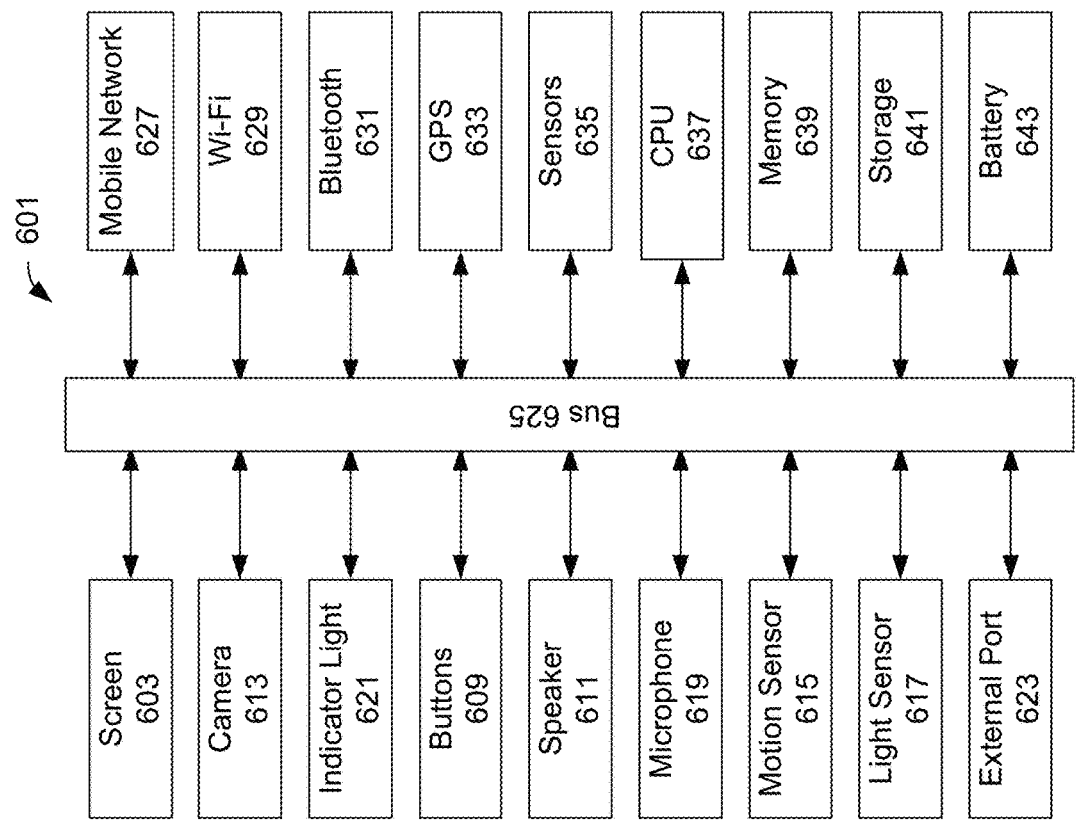
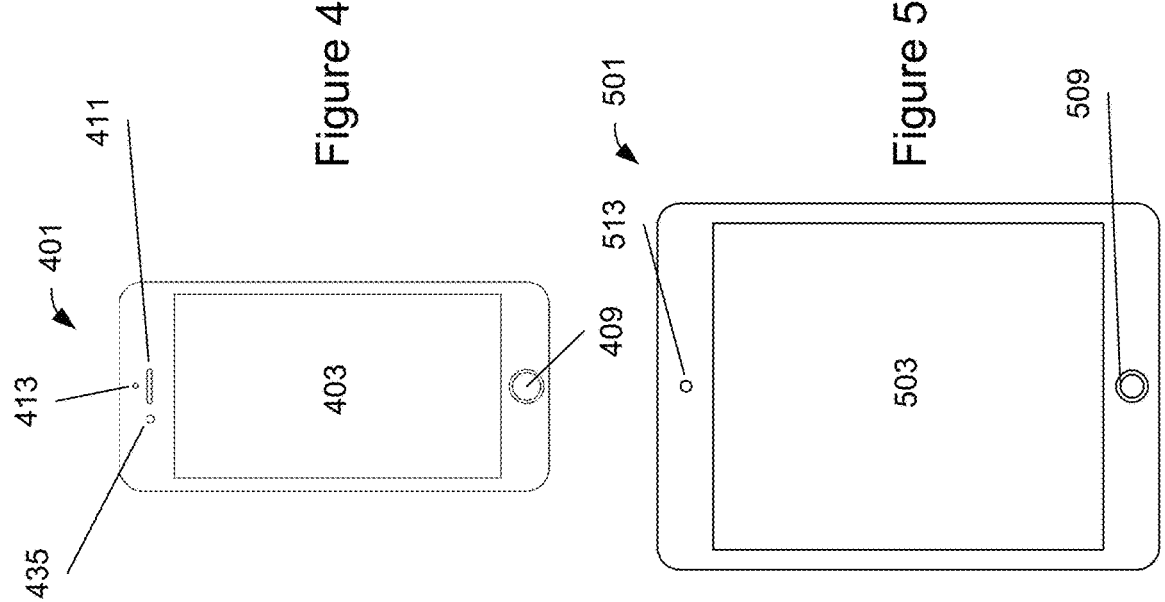

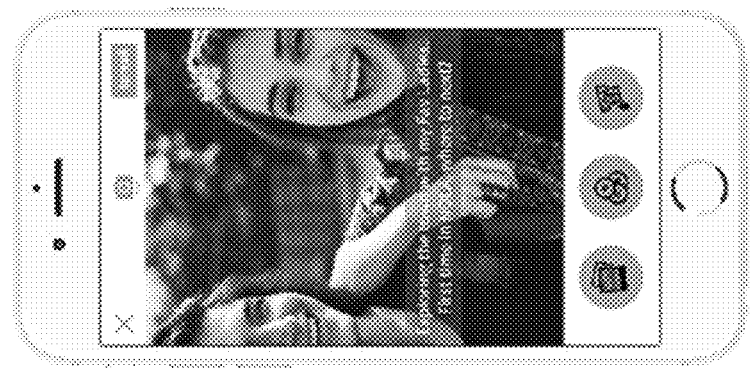
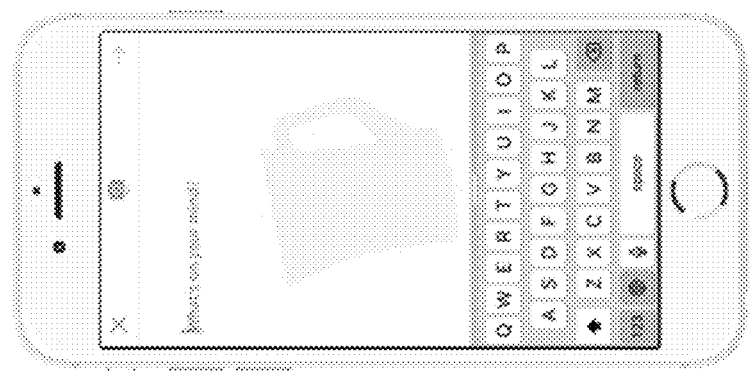
Figure 22
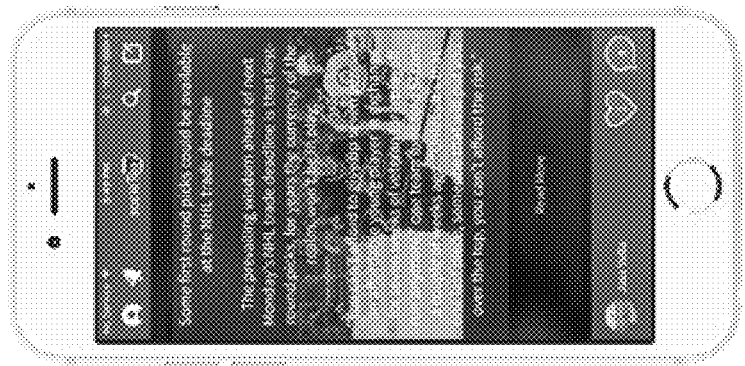
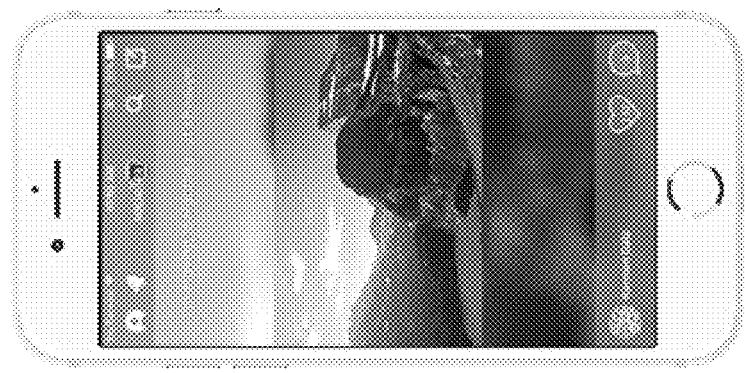
Figure 21

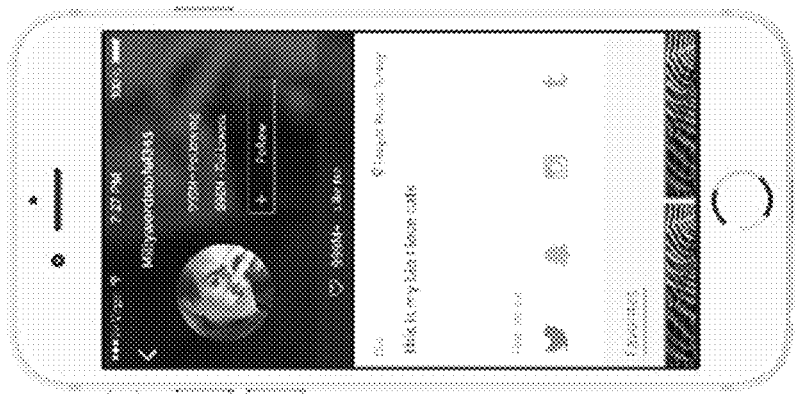
Figure 24
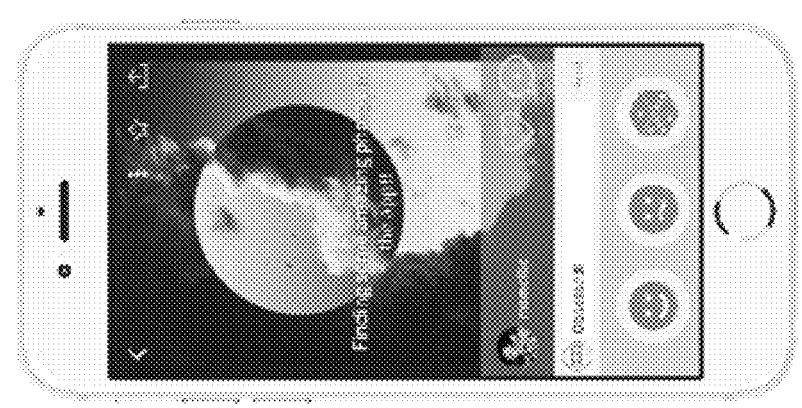
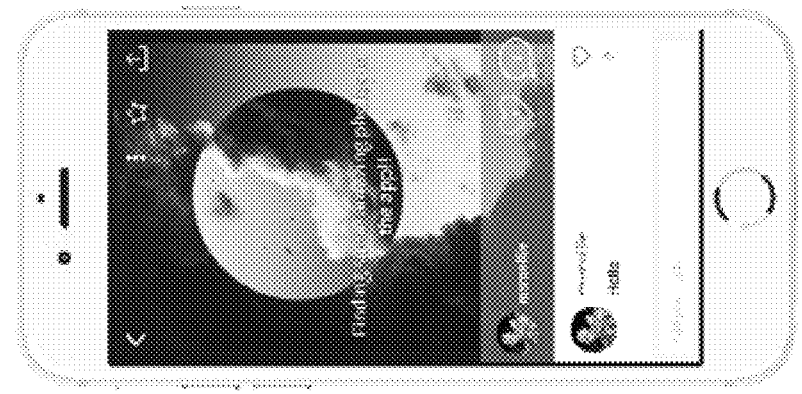
Figure 23

Figure 26
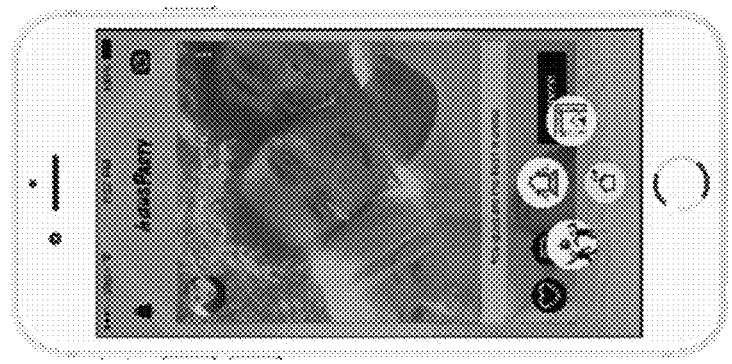
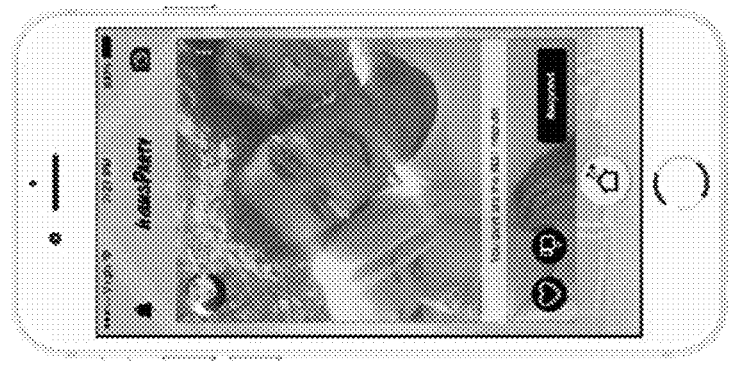
Figure 25

MACHINE LEARNING SYSTEM AND METHOD TO IDENTIFY AND CONNECT LIKE-MINDED USERS

CROSS-REFERENCE TO RELATED APPLICATIONS

This patent application claims the benefit of U.S. patent applications 62/344,938 and 62/344,946, filed Jun. 2, 2016, which are incorporated by reference along with all other references cited in this application.

BACKGROUND OF THE INVENTION

The present invention relates to the field of software and information management, and more specifically, to social networking.

Social networks track and enable online connections between users. Typical social networking systems allow users to associate themselves with other users to create a network of connections among the users of the social networking system.

Despite the success of existing social networks, there is a need for improved social networking and software techniques.

BRIEF SUMMARY OF THE INVENTION

A system and method for a platform identifies and connects like-minded individuals based on interaction. An implementation of the platform is a mobile application.

In an implementation, a method includes: providing a social graph, where the social graph includes: a first type of node, referred to as a user-provided node, a first type of edge, referred to as a user-provided edge; and a second type of edge, referred to as a system-provided edge. The method includes: using at least one electronic processor, managing the social graph including: creating a user-provided node for each user of a system including the social graph; allowing a first user-provided node for a first user to become connected a second user-provided node for a second user via a first user-provided edge; allowing the first and second users to view the first user-provided edge; allowing the first user-provided node to become connected a third user-provided node for a third user via a first system-provided edge; disallowing the first and third users to being able to view the first system-provided edge; and displaying to the first user others users that are connected to the first user via user-provided edges but not system-provided edges.

In various implementations, via the first user-provided edge, the first user-provided node is separated by one degree of separation from the second user-provided node. The managing the social graph can include: allowing the second user-provided node to become connected a fourth user-provided node for a fourth user via a first and second user-provided edges, where via the second user-provided edge, the first user-provided node is separated by two degrees of separation from the fourth user-provided node.

The method can include: delivering a first informational content to a first colony group of the social graph, where the first colony group includes user-provided nodes connected together via the first system-provided edge, which includes the first and third user-provided nodes. The method can include: disallowing delivering of the first informational content to the second user-provided node, which is not connected to the first system-provided edge.

Managing the social graph can include: allowing the second user-provided node to become connected a fourth user-provided node for a fourth user via a second system-provided edge. The method can include: delivering a first informational content to a first colony group of the social graph, where the first colony group includes user-provided nodes connected together via the first system-provided edge, which includes the first and third user-provided nodes; and delivering a second informational content to a second colony group of the social graph, where the second colony group includes user-provided nodes connected together via the second system-provided edge, which includes the second and fourth user-provided nodes.

In various implementations, the first informational content is not delivered to the fourth user-provided node, and the second informational content is not delivered to the third user-provided node. The system creates the first user-provided edge because the first user indicated a connection to the second user. The system creates the first system-provided edge although the first user had not indicated any connection to the third user. The system creates the first system-provided edge although the first user had not indicated any connection to the third user.

In an implementation, a system includes: a first mobile phone, where the first mobile phone includes a touchscreen and a wireless transceiver; a software application program, including code executable on a processor of the first mobile phone. The software application program include: code to cause the wireless transceiver to connect and access to a social network. The social network includes: a first type of node, referred to as a user-provided node, a first type of edge, referred to as a user-provided edge; and a second type of edge, referred to as a system-provided edge. The social network is managed including: creating a user-provided node for each user of a system including the social graph; allowing a first user-provided node for a first user to become connected a second user-provided node for a second user via a first user-provided edge; allowing the first and second users to view the first user-provided edge; allowing the first user-provided node to become connected a third user-provided node for a third user via a first system-provided edge; and disallowing the first and third users to being able to view the first system-provided edge.

The system includes: code to generate a first touch interactive screen for a first user of the first mobile phone a picture of second user of a social network, where the second user is connected to the first user via a system-provided edge; code to generate a second touch interactive screen for the first user of the first mobile phone a picture of third user of a social network, where the third user is connected to the first user via a user-provided edge; code to generate a third touch interactive screen to allow the first user to select from a list of system-generated ice breaker questions to send to the second user; and code to generate a fourth touch interactive screen to the first user to start a party and invite one or more others users of the social network to the party.

In various implementations, the system includes: a second mobile phone, where the second mobile phone includes a touchscreen and a wireless transceiver; a software application program, including code executable on a processor of the second mobile phone. The software application program includes: code to generate a fourth touch interactive screen to a third user of the second mobile phone including a first informational content for a first colony group of the social graph, where the first colony group includes user-provided nodes connected together via the first system-provided edge, which includes the first and third user-provided nodes.

The system creates the first system-provided edge although the first user had not indicated any connection to the third user. The system creates the first user-provided edge because the first user indicated a connection to the second user.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 4-5 show examples of mobile devices, which can be mobile clients.

FIG. 6 shows a system block diagram of mobile device.

FIG. 21 shows the Cafe Scene app, main view.

FIG. 22 shows the Cafe Scene app, compose view.

FIG. 23 shows the Cafe Scene app, comment view.

FIG. 24 shows the Cafe Scene app, profile view.

FIG. 25 shows the House Party app, main view.

FIG. 26 shows the House Party app, comment view.

DETAILED DESCRIPTION OF THE INVENTION

Figure 1:
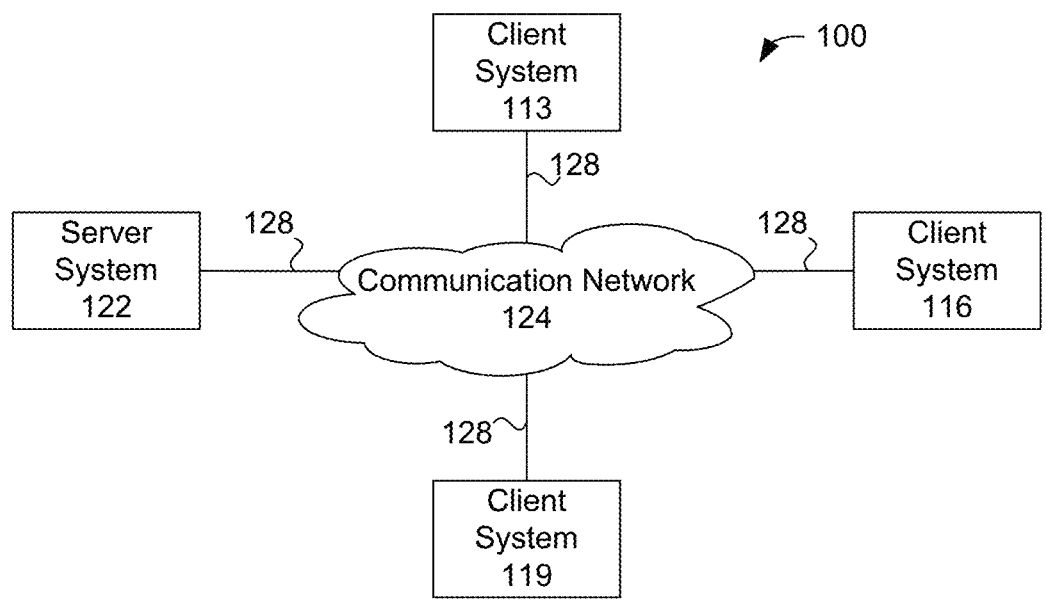
FIG. 1 shows a simplified block diagram of a client-server system and network in which an embodiment of the invention may be implemented.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a stand-alone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
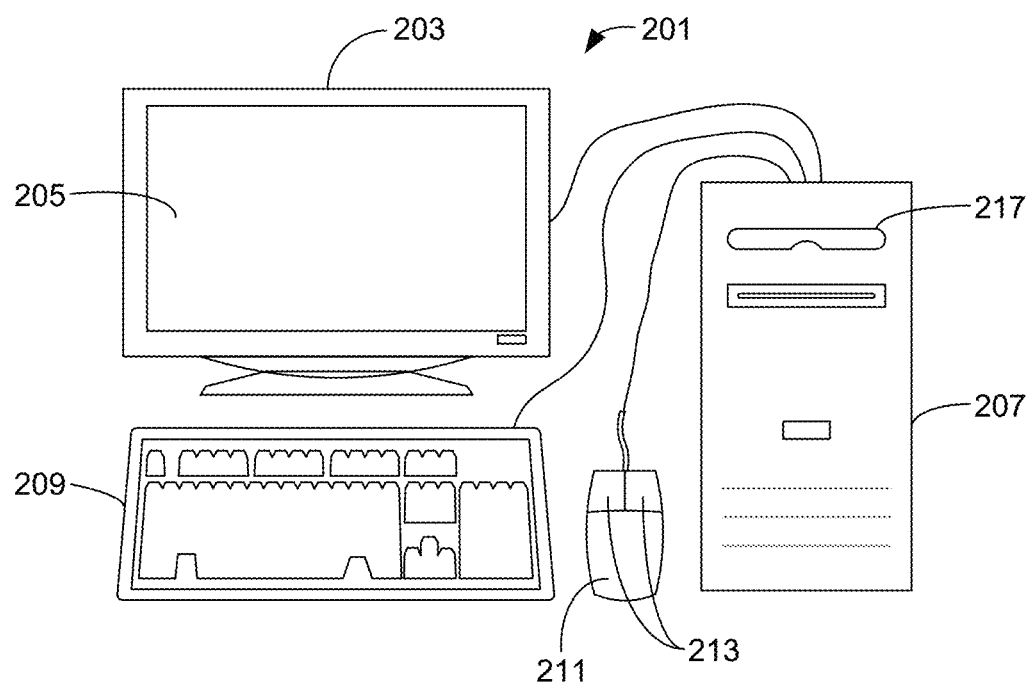
FIG. 2 shows a more detailed diagram of an exemplary client or server which may be used in an implementation of the invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad or Apple iPad mini), Apple iPod (e.g, Apple iPod Touch), Samsung Galaxy product (e.g., Galaxy S series product or Galaxy Note series product), Google Nexus devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
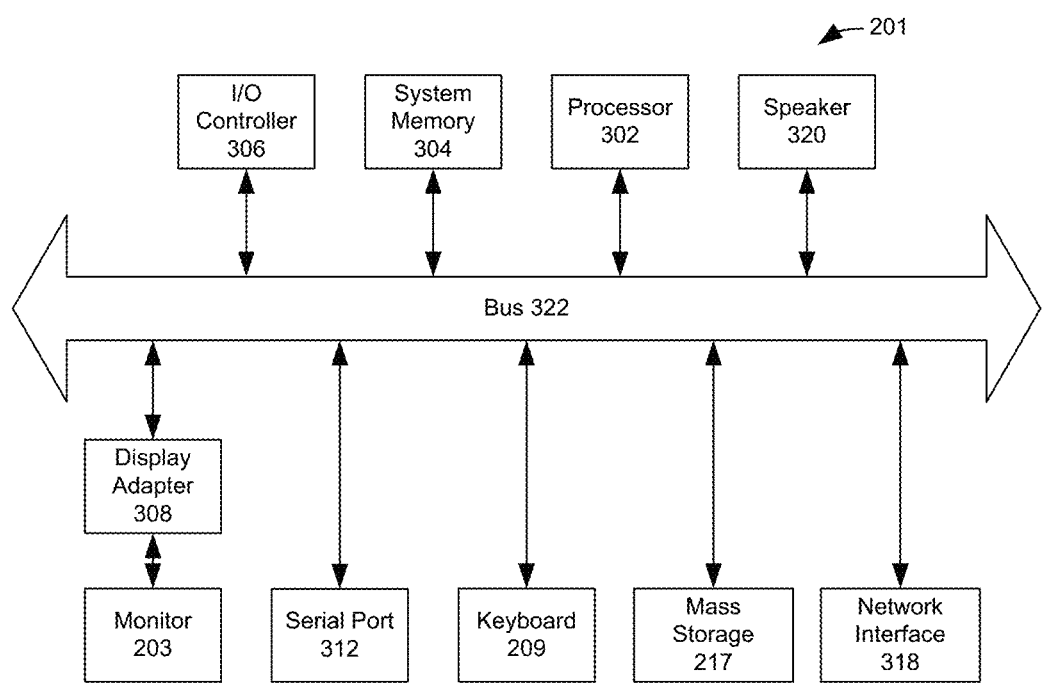
FIG. 3 shows a system block diagram of a client or server computer system used to execute application programs such as a web browser or tools.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C #, Pascal, Fortran, Perl, Matlab (from MathWorks, www-.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, ixRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

FIGS. 4-5 show examples of mobile devices, which can be mobile clients. Mobile devices are specific implementations of a computer, such as described above. FIG. 4 shows a smartphone device 401, and FIG. 5 shows a tablet device 501. Some examples of smartphones include the Apple iPhone, Samsung Galaxy, and Google Nexus family of devices. Some examples of tablet devices include the Apple iPad, Samsung Galaxy Tab, and Google Nexus family of devices.

Smartphone 401 has an enclosure that includes a screen 403, button 409, speaker 411, camera 413, and proximity sensor 435. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 409 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 501 is similar to a smartphone. Tablet 501 has an enclosure that includes a screen 503, button 509, and camera 513. Typically the screen (e.g., touch screen) of a tablet is larger than a smartphone, usually 7, 8, 9, 10, 12, 13, or more inches (measured diagonally).

FIG. 6 shows a system block diagram of mobile device 601 used to execute the software of the present invention. This block diagram is representative of the components of smartphone or tablet device. The mobile device system includes a screen 603 (e.g., touch screen), buttons 609, speaker 611, camera 613, motion sensor 615, light sensor 617, microphone 619, indicator light 621, and external port 623 (e.g., USB port or Apple Lightning port). These components can communicate with each other via a bus 625.

The system includes wireless components such as a mobile network connection 627 (e.g., mobile telephone or mobile data), Wi-Fi 629, Bluetooth 631, GPS 633 (e.g., detect GPS positioning), other sensors 635 such as a proximity sensor, CPU 637, RAM memory 639, storage 641 (e.g., nonvolatile memory), and battery 643 (e.g., lithium ion or lithium polymer cell). The battery supplies power to the electronic components and is rechargeable, which allows the system to be mobile.

U.S. patent application Ser. Nos. 15/612,587, 15/612,603, 15/612,633, and 15/612,655, filed Jun. 2, 2017, are incorporated by reference.

We present a system and method that identifies like-minded users and allows them to:

1. generate, spread and share content in computing platforms.

2. communicate among each other where;

content is a piece of information such as text, image, video, audio, URL link.

computing platforms can be classified into two categories: mobile and stationary platforms.

Mobile Computing Platforms:

are handheld computing devices, typically having a display screen with a touch input or keyboard, or any combination. They have an operating system (OS) and can run various types of application software, also known as App. Most handheld devices can be equipped with WiFi, Bluetooth, GPS and RF capabilities that allow connections to cellular networks, the Internet or other devices for voice or data communication. Smartphones, PDAs, tablet computers, wearable computers such as smart watches, laptop computers, personal navigation devices and cameras are some of the popular examples.

Stationary Computing Platforms:

include servers, mainframe and supercomputers and desktop computers. Typically these platforms have great computing power, therefore, requiring significant electric power to operate. Therefore, their physical sizes or power requirements, or a combination, prevent them from being a mobile device. Servers operate within a client-server architecture. The server part is a system that responds to requests across a computer network to provide a service. The client is the component that generates the requests. The clients typically connect to the server through the network but may also run on the same computer. Another typical arrangement is peer-to-peer networking that enables all computers to act as either a server or client as needed.

The CSE—Content Spreading Engine Description

We present a content spreading tool that works in mobile or stationary computers, or any combination. The software program, or the app in mobile platforms, spreads contents using a unique algorithm that utilizes several parameters such as the influence region of the author, location, like-minded users in a colony, social graph, discovery and virality.

The author is the person who originates the content. The reader is the person who receives the content. The colony is the group users belong in, based on several parameters such as their social connections, preferences, tastes, as well as location. The size of a colony varies as users join or leave and one user may belong to several different colonies, depending on the content. location: the geographic region user lives in.

When content reaches a reader, he or she has an option to ignore or spread this content to others.

Figure 7:
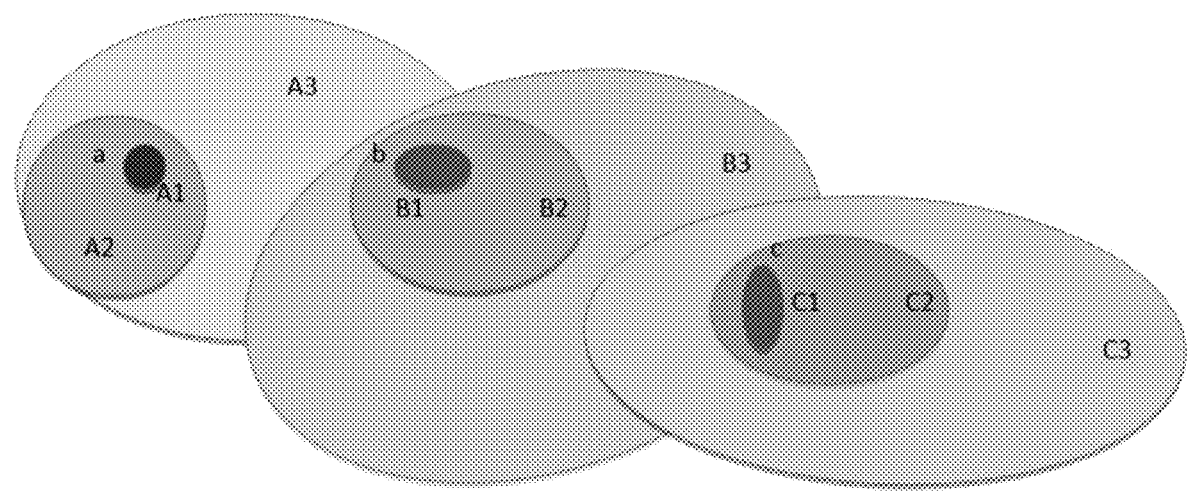
FIG. 7 shows a typical message spreading flow.

FIG. 7: A typical message spreading flow: a message generated by person a, spreading to locality A1, A2 and A3 subsequently, distributed again by person b to locality B1, spreading to locality B2 and B3 and reaching person c, consequently spreading to localities C1, C2 and C3.

Figure 8:
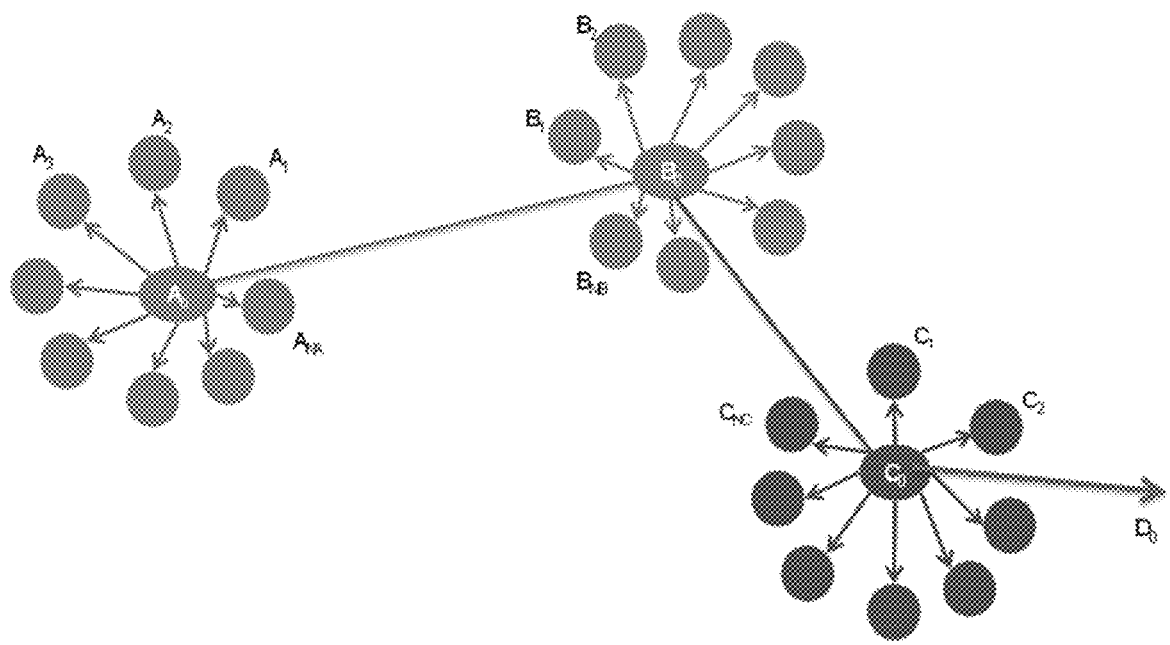
FIG. 8 shows a message originating from person A0, spreading to persons A1, A2, . . . , A(NA).

FIG. 8: A message originating from person $A_0$, spreading to persons $A_1, A_2, \ldots, A_{NA}$; then skipping to person $B_0$ in a different colony, spreading to persons $B_1, B_2, \ldots, B_{NB}$; then skipping to person $C_0$ in a different colony, spreading to persons $C_1, C_2, \ldots C_{NC}$; then skipping to person D in a different colony, and so on.

Design

1. If an author composes a content, 1a. the content is broadcasted to every user who's interested to ensure maximum exposure, 2. if a user is receiving a content, 2a. only interesting content is delivered to that user, 3. Users' preferences and interest might change by time, the system is able to track those changes.

4. Given a content, the recommendation engine identifies all the users in the system who are likely to find this content enjoyable.

5. The objective of the recommendation engine is to maximize its recommendation accuracy, Ω, a real number between [0,1], so that $$\Omega = \Sigma_{i \mu_i / N} = 1$$

where i=1, 2, . . . , N,

N is the number of users who are exposed to given content, $c_i$, $\mu_i$ is reaction of user i for content $c_i$ so that $\mu_i = 1$ if user i indicates he or she likes content $c_i$ $\mu_i = 0$ if user i indicates he or she dislikes content $c_i$.

Content Filtering

Given the selectivity in perception of each individual, a given content may or may not be of interest for everyone included in an author's colony. Based on the previous spread/ignore pattern of a given person, the CSE characterizes and quantifies each individual's interest range. When a content is to be spread, for each content the CSE determines a set of target receivers. The users who get the content are given several options to provide feedback such as:

Option 1: Spread this content further (interesting content).
Option 2: Kill this content (do not spread).
Option 3: The user does not care about this content.
Option 4: Edit and spread this content (mutation).

The options can be selected by pressing a software button or a similar voting gesture.

By continuously recording the user's spread/kill/ignore (or like/dislike/skip) reaction to contents, the CSE learns the user behavior and his/her interest range. The algorithm forms two main groups: clusters of user groups and clusters of content groups. Based on the modeled interest, the algorithm maps these two main groups.

In an implementation, the user can give his or her reaction to a particular content by using a spread, kill, or ignore indication, or any combination of these. This can be done, for example, by selecting a button for spread, kill, or ignore (or like, dislike, or skip). The user will use spread to indicate agreement or approval of content, kill to indicate disagreement or disapproval of content, and ignore to indicate to a preference not to take notice of such content.

In other implementations, other words or buttons may be used for similar concepts, such as like (or thumbs up or happy face) being used instead of spread, dislike (or thumbs down or unhappy face or red face) being used instead of kill, and do not show such content in future instead of ignore.

An implementation may include spread, kill, or ignore in any combination. For example, the system can have only spread or like. The system can have only spread (or like) and ignore. The system can have only spread (or like) and kill. The system can consider a user not indicating spread (or like) as indicating a kill (or dislike).

A new content is first spread to users that algorithm identifies as "likely to respond users." If these users chose to spread this new content, then the algorithm constantly searches for other users who might spread this content as well. If the set of "likely to respond users" chose to kill this new content, then the algorithm first tries to deliver this content to other users, if they do not choose to spread either, determines the content is perhaps uninteresting to anyone and stops spreading.

Spreading Power of Authors (Influence Region)

Each author has a unique expression style and interest range that contribute significantly to his or her spreading power. In fact, it is possible for the same content to have a completely different reach when it is expressed by two different persons. Depending on the person's previous spreading history, the algorithm assigns a unique spreading power and uses this parameter for its spreading function.

Content Reach

Based on the content characteristics the number of people it spreads will vary. The primary driver of content spread is the content of the content and author's publicity. Another driver is the environment where the content circulates. Typically contents passed within tight and trusted networks have less reach but greater impact than those circulated through dispersed communities.

Content Characteristics

Contents have several attributes that may be used for clustering. Some of them are content indicator, content category, generator's identity, environmental variables (such as geographic region, current events, local culture). Some examples for categories are: News, Gossip, Rumors, Secrets, and so forth.

Furthermore, content processing techniques such as Natural Language Processing, video and image processing, keyword detection are utilized for clustering.

This content can either be spread with known identity (such as Facebook, Google+, or Twitter username) user's actual name or a nickname. Nicknames allow users to author and react to contents anonymously.

Spreading Function

This is the main outcome of the algorithm that governs its content spreading behavior. The algorithm orders users based on users' previous responds such as kill/spread/ignore (or like/dislike/skip) actions for each given content and distributes the content to most likely to respond users as well as "test" users. The test group can be used for new users as well as users who have changed their opinions or tastes.

Figure 9:
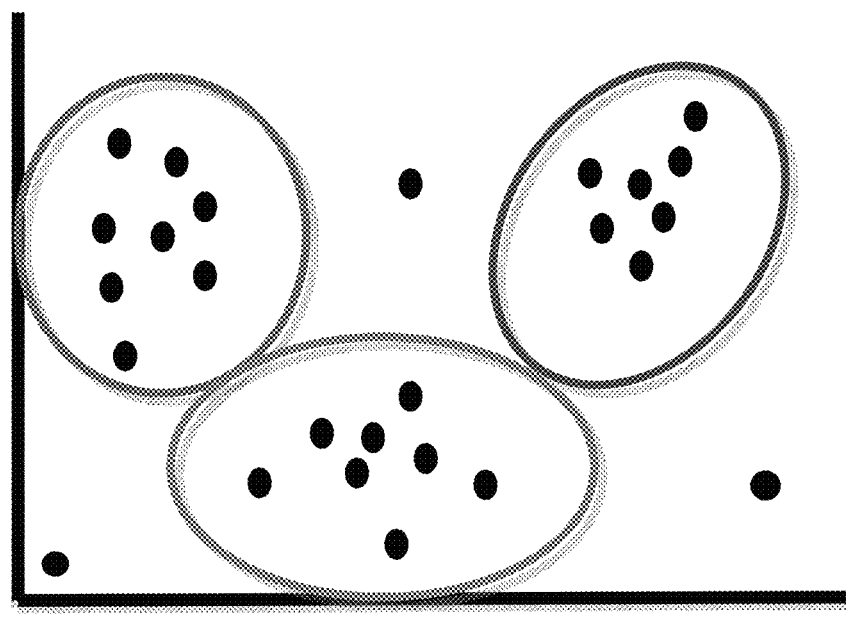
FIG. 9 shows the main outcome of the algorithm that governs its content spreading behavior.

See FIG. 9.

FIG. 9 shows the main outcome of the algorithm that governs its content spreading behavior.

What the CSE Achieves:

Users receive relevant content from anyone in the world, which is not limited to users' existing friends/connections through social media. Therefore the content is expected to be have more variety. Through a richer set of content feed, users are expected to see contents that are surprising, leading to discovery of new elements. Deliver users only content that is expected to be interesting, i.e., minimize voting for "stop." Since users provide feedback for each content presented, the CSE learns users' preferences. Since users provide feedback for each content presented, the CSE tracks changes in users' preferences. Since the CSE finds the right distribution list for every given content, authors do not need to specify a recipient list. Since the CSE identifies like-minded groups (colonies), it makes global friendship and communication possible. The recommendation engine allows delivering content and connecting to the right users.

By Using the CSE, What the Overall System Achieves:

Identify like-minded users based on content, participation, commenting, favoriting, and other system functions. By expanding users social network with other like-minded users called pals, user is exposed to new content coming from pals, enhancing the experience and allowing users to discover new content. Introduce pals to each other to create a "global house party" or a global cafe environment and allow direct communication among each other. Allow pals to form ephemeral chat rooms. Allow users to create exclusive private chat rooms.

It uses a "user accreditation" scheme such that:

1. A new content coming from a new user is first delivered to a small group of people.

2. Based on the reaction, the CSE delivers this message to a wider audience

3. As the new user keeps generating contents that receive acceptance in his/her colony, the size of the spreading gradually is made bigger.

4. In case the content is a video, the allowed length of the video gets longer as the user establishes good standing.

5. One benefit from the user accreditation scheme is to prevent users from injecting obscene or violence related content into this platform.

6. Users are also allowed to select either a private distribution list from their address book or the more general automatic distribution (spreading) mechanism to broadcast their messages.

We combine these features on a set of products with a User Interface (UI) that has several functions such as:

1. Commenting by templates.
2. Self-expression keyboards.
3. Starting a conversation by using templates.
3a. where "templates" are pre-composed text phrases and symbols.
4. when users select to send "virtual" flowers, drinks and so forth to each other, the action is gamified (animated) by certain graphics.
5. Some user groups are exclusive and only authorized users may be given membership to exchange messages.
6. User biographies are displayed on their profile pages and there are templates to make data entry fun and easy.
7. Certain buttons are offered to self-expression. Certain built-in buttons and themed badges are used to facilitate conversation among users (ice breakers).
8. Certain mechanisms are used to reward and encourage users to:
   8a. generate content.
   8b. start conversations, participate in existing conversations, prolong or extend conversations (e.g., encourage longer lasting conversations).
   8c. make contents popular.
   8d. make as many friendships as possible (popular persona).
9. Deliver all these functions is a real-life-like appearance such as:
   9a. Cafe scene socialization environment.
   9b. Bar scene environment.
   9c. House party socialization environment with.
   9c(1). Rooms that are dedicated for certain actions such as:
   9c(1)i. Main room for socializing with many people simultaneously.
   9c(1)ii. Back yard and pool party for socializing with groups of people.
   9c(1)iii. Fireplace chat for socializing with fewer individuals.
   9c(1)iv. Bedroom chat for having conversations with romantic content.
   9c(1)v. Dance floor for entertaining with music.
10. Not only these functions allow for socialization and communication but also dating.
   10a. in person (physical).
   10b. virtually (remotely) through the App.

Figure 10:
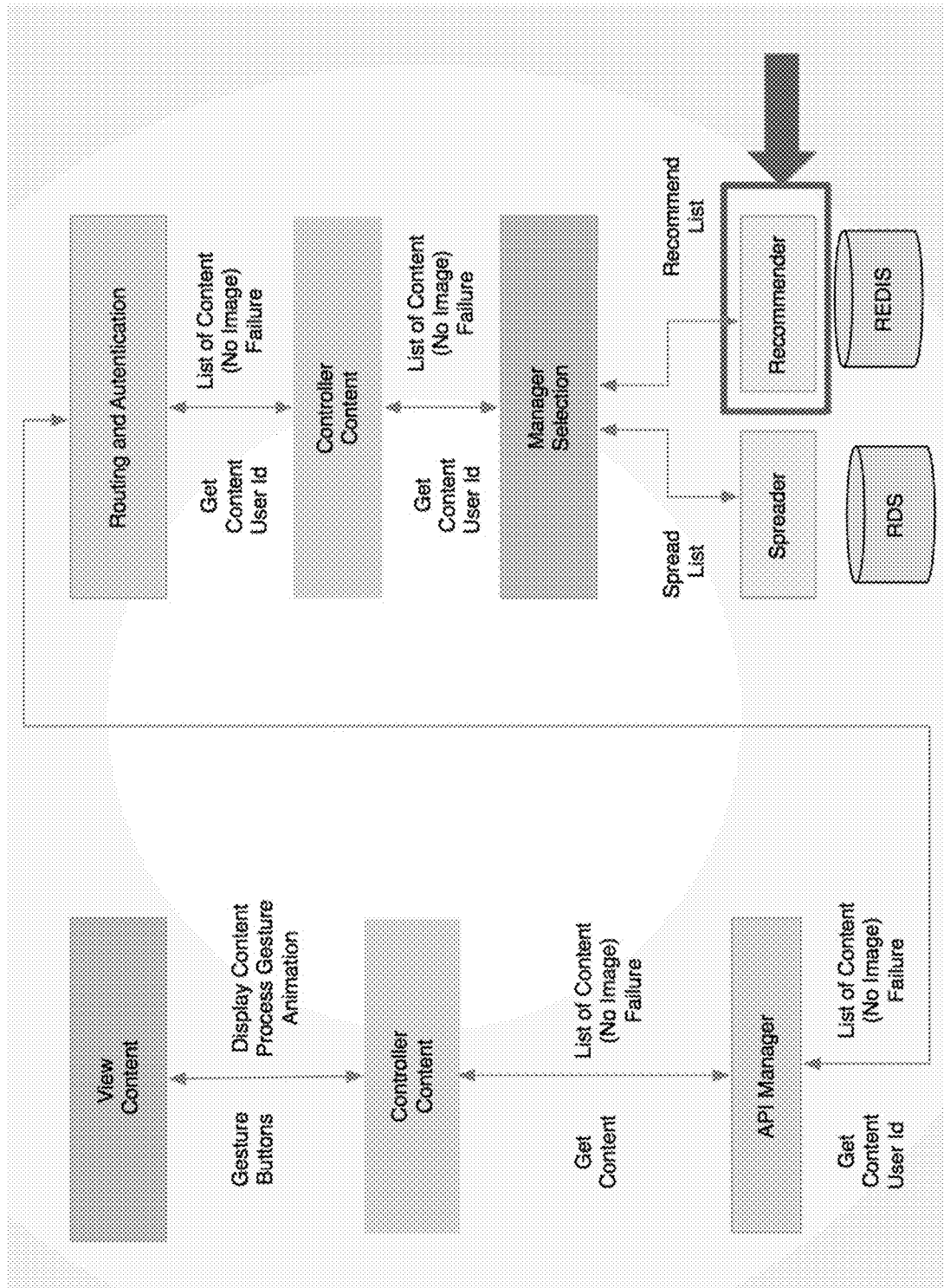
FIG. 10 shows the overall system.

FIG. 10 shows the overall system.

Figure 11:
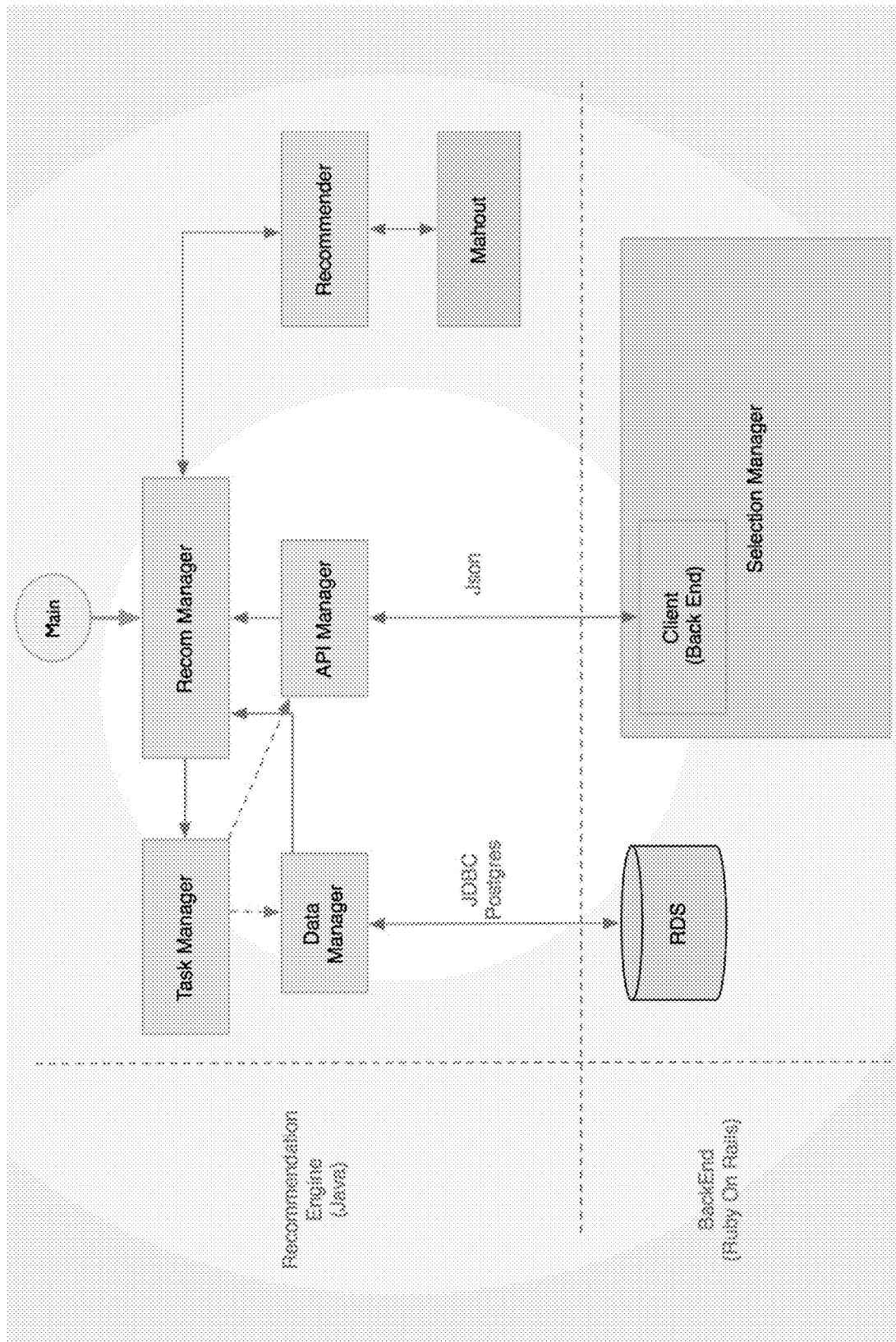
FIG. 11 shows the recommendation engine architecture.

FIG. 11 shows the recommendation engine architecture.

Figure 12:
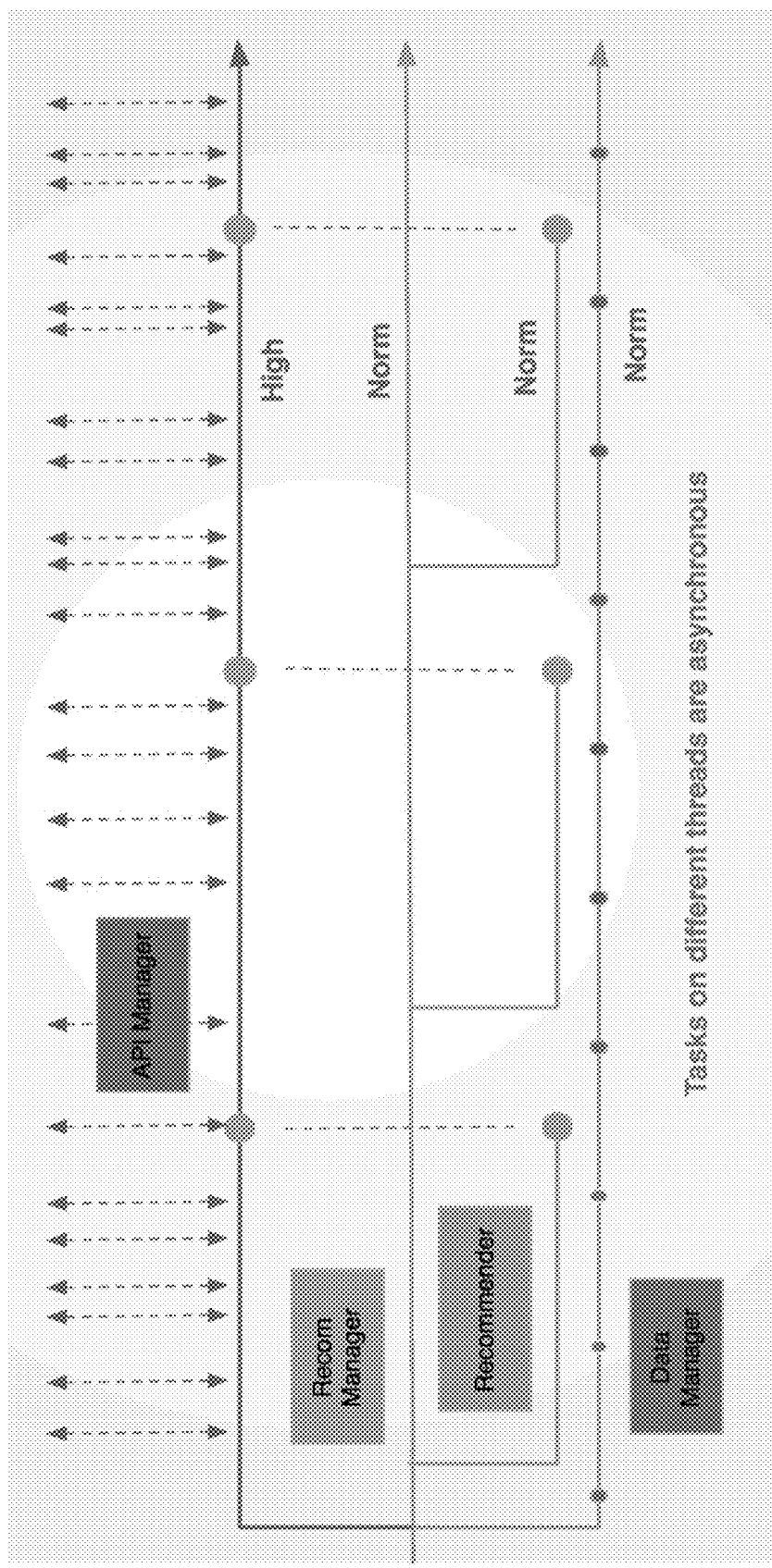
FIG. 12 shows the recommendation engine task threading.
Figure 13A:
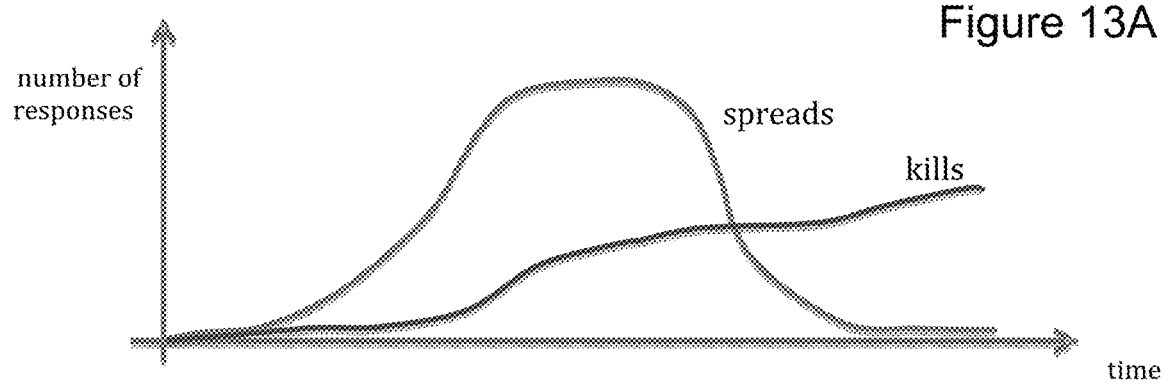
FIGS. 13A-13D show the typical message spread characteristics.
Figure 13B:
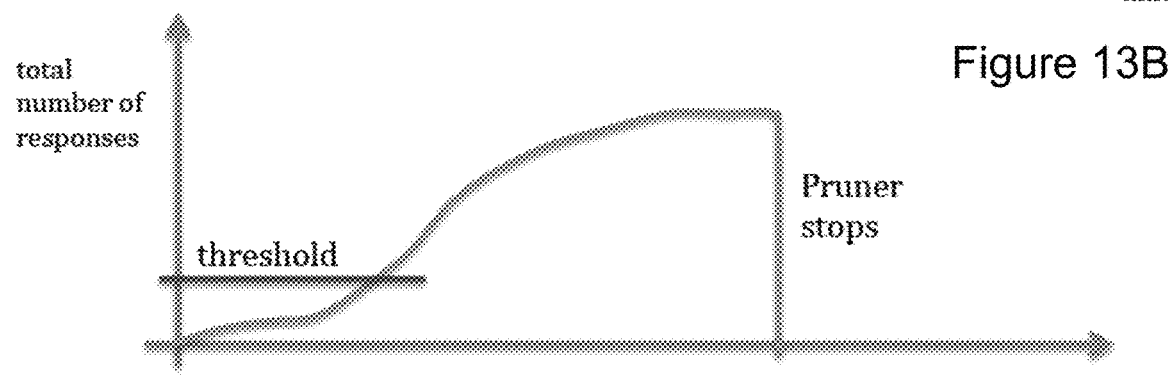
Figure 13C:
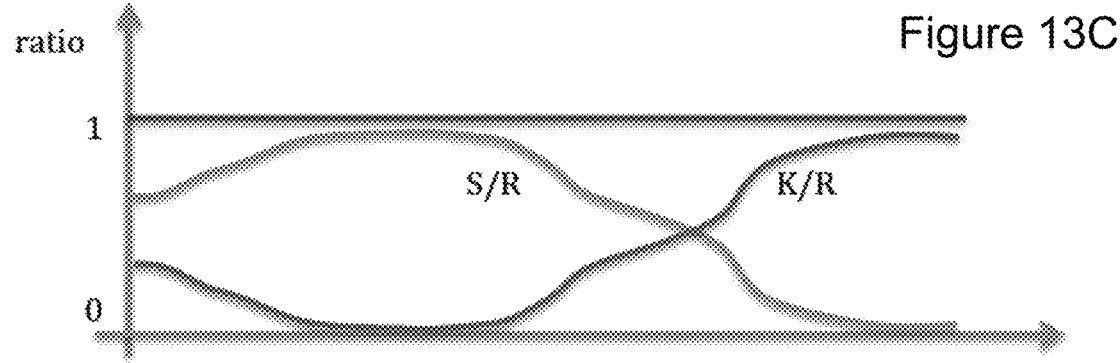
Figure 13D:
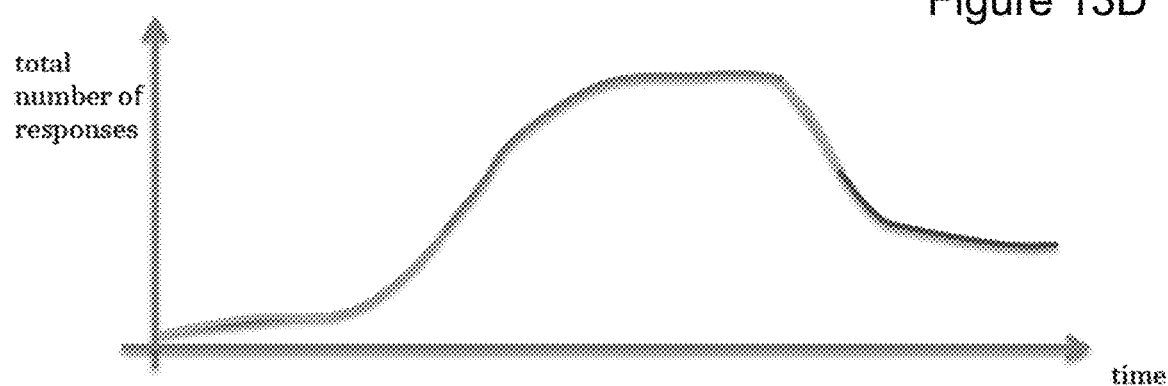

FIG. 12 shows the recommendation engine task threading.

The recommendation engine: Uses collaborative filtering (makes both user-based and content-based recommendations).

One implementation example is that it may be built on Apache Mahout, be implemented on Java, use Json-based full duplex APIs, and use a separate EC2 instance on Amazon Web Services.

Content Spreading Mechanism Details

SPREADER (SP) is to initially push a given content, Ci.

If PRUNER (PR) determines that the content does not have any spreading potential, it may decide to stop spreading Ci anytime.

If the initial spread of Ci by SP goes well, RECOMMENDER (RE) takes over the task of spreading Ci.

Decisions on spreading, killing will be based on number of times this content has been pushed (either by RE or SP), number of spread/kill responses, time, or number of fresh content waiting to be pushed, or any combination of these.

Remarks

We only get response to a content if it has already been pushed to users by the system (not necessarily it's a popular content).

If a content consistently is not making it to the top percentile of the recommendations queue, most likely it's not interesting enough.

Due to worldwide timing and so forth, the ideal audience for Ci may not be online during the spread. This may lead to PR stopping the spread prematurely.

While the user base is growing, the number of new users would be a significant portion of total users. Therefore, if Ci is originally stopped from delivery, it might still be interesting to some new users several days later.

Prevents spams. For example, it detects if a dominating amount of content is coming from a user (spammer generated contents).

Spreadability (Si) of a Given Content Ci

Factors affecting spreadability Si includes, but not limited to:

S1: total number of spread/kill votes in a given time period (trend).

Remark 1: due to time zones etc, this time interval may not be too short.

Remark 2: This is dependent on how frequently our system has pushed Ci.

S2: total number of commenting and then voting.

S3: total number of just viewing comments and then voting.

S4: total number of comments in Ci (popularity).

S5: average time each user viewed Ci.

S6: total number of shares in other platforms (e.g., Facebook, Twitter, or other social networking platforms or SMS).

S7: total number of screen shots.

S8: total number of reporting/flagging.

S9: ratio of spreads or total votes: S/(S+K).

Spread: positive; Kill: negative; w1<w2< . . . <w9; $Si=f(w^T s)$; $f(x)=1/(1+e^{-x})$.

Reaction (Rij): Weighting User j's Vote for Content Ci

Factors affecting reaction Rij includes but not limited to:

T1: spread/kill vote.

T2: commenting and then voting.

T3: just viewing comments and then voting.

T4: time this user viewed Ci.

T5: number of shares in other social networking platforms.

T6: if a user saves a screen shot.

T7: if user reports/flags a content.

Spread: positive; Kill: negative; w1<w2< . . . <w7; $Rij=f(w^T t)$; $f(x)=1/(1+e^{-x})$.

Content Bucket

The content bucket is used to keep contents for delivery and orders them with respect to the several factors, such as:

B1: user generated.

B2: system generated.

B3: freshness.

B4: spreadability.

B5: location.

and deliver to users.

w1<w2< . . . <w5;

making w5 adaptive is to detect if Ci has a totally local nature.

When to Stop Pushing a Content Ci: (PRUNER)

Consider a time window, W, with last (one day/hour/minute):

$$T=a1(K/V)+a2(S/P).$$

where:

T: threshold to stop delivering a content.

S: total number of spreads for content Ci.

K: total number of kills for content Ci.

V: total votes for content Ci (S+K).

P: total pushes (S+K) of all contents during W.

Remark: the first part indicates how much Ci is liked by our users, the second part indicates how Ci competes with the rest of the contents in the bucket.

App Success Index

ASI=minimum number of likes for the RE engine to kick in. This number should be as small as possible. This index gets smaller as the recommendation engine learns users tastes and forms the clusters.

FIGS. 13A-13D show the typical message spread characteristics.

When a user requests content, following combinations are to be handled:

old user—old content: the algorithm uses their history to match.

old user—new content: the algorithm uses user's history and who generated the content.

new user—old content: the algorithm uses content's popularity and distribution.

new user—new content: the new content should be first pushed to known users to get an initial reaction about spreadability.

Content model has the following properties. These are related to each content (Ci).

1. Spread Count (S): Total number of users that pressed spread button for Ci.

2. Kill Count (K): Total number of users that pressed spread button for Ci.

3. Total Count (T): S+K.

4. Freshness Factor (F): A real number between [0,1] that determines how fresh the content Ci is.

5. Spreading power (SP): A real number that captures the spreading power of content Ci. SP is a real number between [−1, 1]; values [0 1] indicating the content is spreading well, values [−1 0] indicating the content is dying.

Figure 14A:
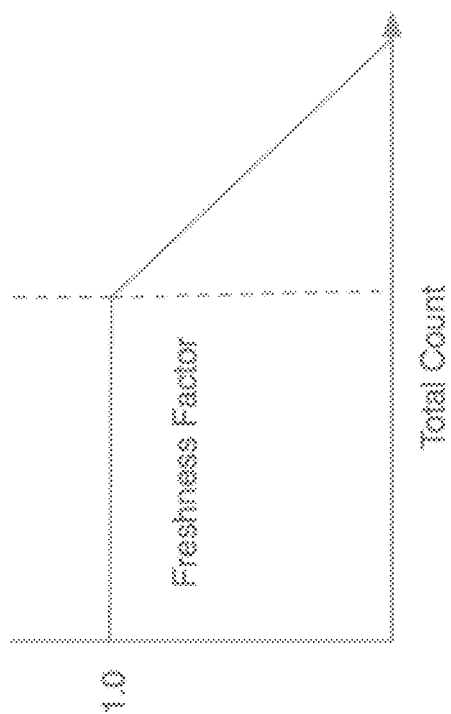
FIGS. 14A-14B show the implementation of freshness factor.
Figure 14B:
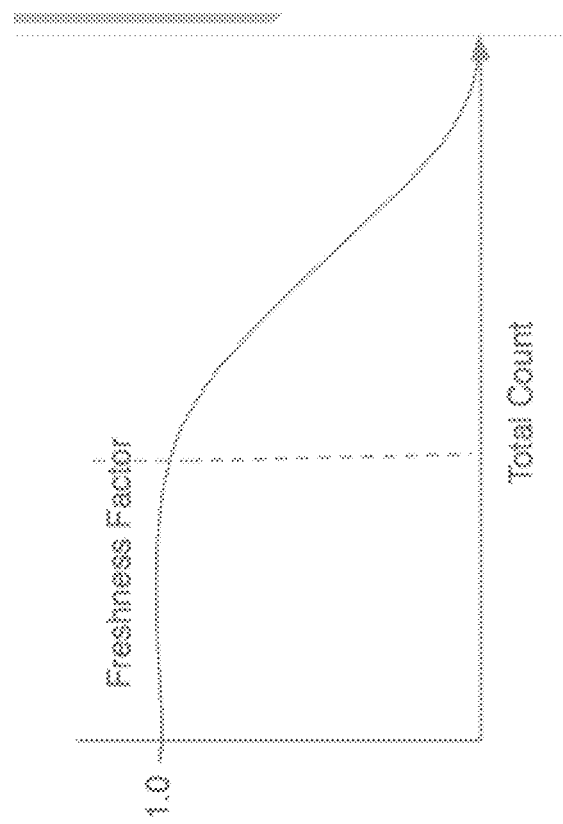

For example FIGS. 14A-14B show the implementation of freshness factor.

DEFINITION $$SP=[(Ws\ S-Wk\ K)+(S-K)(Wc\ C+Wl\ L)]/[(Ws\ S+Wk\ K)+|S-K|(Wc\ C+Wl\ L)],$$

if T>0.

=1.0 otherwise.

where,

Ws: weight for spread (say 10).

Wk: weight for kill (say 10).

Wc: weight for comment (say 5).

Wl: weight for comment likes (say 1).

Comment Count (CC): Total number of comments for $C_i$.

Total Like Count (L): Sum of all likes for comments for content $C_i$.

Note that this approach does not include a time factor. Also, it does not give any weight to total spread. In other words, SE is scale invariant: S, K, and CC can scaled by the same factor without changing SE.

User Response Model

User Response model properties are related to each user (Uj) for content Ci.

1. Authorship (Aij): It is 1 if the user Uj is the author of the content Ci or 0 otherwise.

2. Number of comments (C): Total number of comments user Uj has made for content Ci.

3. Number of likes (L): Total number of likes user Uj has made for all comments elated to content Ci.

4. User Response for content: User Uj can response for content Ci in two ways: Spread or Kill. The response:
Rij=1 for spread.
Rij=−1 for kill.
5. User Preference Index (Pij): This is the combined value of the user Uj's preference for content Ci.
Definition $$Pij=Wau+(Ws\ S)+(Wc\ C)+(Wl\ L),\ \text{if}\ Aij=1;$$

$$Pij=Ws+(Wc\ C)+(Wl\ L),\ \text{if}\ Aij=0\ \text{and}\ Rij=1$$

$$Pij=Wk-(Wc\ C)-(Wl\ L),\ \text{if}\ Aij=0\ \text{and}\ Rij=-1$$

where,
Wau: weight for authorship (for example, 50).
Ws: weight for spread (for example, 10).
Wk: weight for kill (for example, 10).
Wc: weight for comment (for example, 5).
Wl: weight for comment likes (for example, 1).
It is likely that user may write a comment but might kill the content.
User's own comments (Co) are to be separated from total number of comments (C).

Comment Model

It has the following properties. These are related to each comment (Coi).
1. Like Count (LC): Total number of likes for comment Coi.
2. Popularity: how many other comments it has triggered.

Content Selection

A unique facet of the CSE is its method of selecting contents to spread to users. The CSE has a dynamic feedback system to continually improve the quality of its recommended contents. This process takes place in three stages:
1. The user-based recommendation stage. Given a user U placed in a colony C by the MSE, the expressed preferences for new contents of other users in C, are used to determine a recommendation ranking for each new content. The top-ranked contents are then spread to U.
2. The trending content spreading stage. The CSE identifies "trending content," temporally-relevant messages that are rapidly rising in popularity. These trending messages are classified based on several features. Spread rate (change in number of spreads per time interval), kill rate (change in number of kills per time interval), Comment rate (number of comments from unique users per time interval). These time-varying signals are processed to remove random fluctuations, and then analyzed for patterns predictive of quickly spreading, temporally-relevant information. Finally, when trending contents are identified, a few of the most popular ones are spread to users with reduced emphasis on the user-based recommendation metric.
3. The feedback stage. In this stage, an assessment is made of the user's satisfaction with contents received from the CSE. The user's explicit responses to each content are recorded and integrated into the CSE's model of user preferences. With every feedback analysis, changes in user tastes are noted and categorization of users are reconsidered.

The MSE is comprised of several recommendation components. One of these units is the user-based recommender, while another is the content-based recommender. The content-based recommender classifies content using message meta-data, user-generated tags, and message keywords identified through natural language processing techniques. For every message in the system, an array of features is extracted, including text keywords, message tags applied by the user, and comment keywords. Furthermore, the text of every user's search history, self-disclosed information in user profiles, and propagated messages are stored and analyzed to extract a corpus of keywords representing the user's interests. These keywords are further refined through a comparison with the keywords extracted from each content the user has expressed interest in. With this data the content-based recommender can provide another metric for determining the likelihood that a given user will be interested in a given message. The MSE uses the user-based recommender in conjunction with this content-based recommender. Upon every interaction with a content, the corpus of keywords associated with a user is reassessed.

User Connection

The MSE maintains two data models representing user relationships: 1) a matrix of user's preferences for all contents, and 2) a history of each user's implicit and explicit indications of affinity for other users. These indicators of affinity are weighted with empirically-derived coefficients to reflect statistical likelihood of true interest in a particular user. Given these data models, the MSE can compute a user-similarity metric which denotes the likelihood of affinity between any given pair of users. Using this measure, the MSE can recommend candidates for introduction, once a sufficient level of confidence is achieved. In particular, this enables the establishment of a private communication channel between users with mutually-shared interests. This communication channel, is designed to be ephemeral; expiring after a short period of time (e.g., 16 hours). Furthermore, in order to overcome the inertia of initial social contact, this communication channel is equipped with a custom keyboard comprised of predetermined text and images, sorted by emotional state, that allow users to communicate creatively without the labor of composing a message from a blank slate. In the same vein of this effort, these private messaging channels begin with a reference to some shared history between the two users, of which they were heretofore unaware; for example, contents or users for which they both expressed high interest.

User Similarity

Similarity between users u and v, sim(u,v) is computed as the cosine of their respective rating vectors, Ru and Rv, $$sim(u,v)=\cos(Ru,Rv)=(Ru\times Rv)/(|Ru|\times|Rv|).$$

$$rui=bui+\Sigma(ruj-buj)wij+\Sigma cij,$$

rui is the predicted value of the unknown rating rui,
bui is the preliminary estimate of the unknown rating rui, estimates.
wij is the weight from j to i, representing offsets to the preliminary estimates.
rui−bui viewed as coefficients to these offsets,
R(u) contains all contents for which ratings by u are available.
cij is the weight from j to i, representing offsets to the preliminary estimate due to the implicit user feedback by u to j.
Items i and j represent integers.

Auto-Tuning of Parameters

The recommendation error can be used to adaptively adjust the recommender parameters to improve its recommendation accuracy, in a closed loop feedback system fashion. The recommendation error is basically the sum of dislikes (or, kills) indicated by the user in a given time window.

Given the volume of the data, it is difficult to manually adjust the recommender parameters. The parameter adjustment is also needed due to various reasons such as changes in user's taste, seasonal characteristics of data, as well as personalization of recommendation.

Figure 14C:
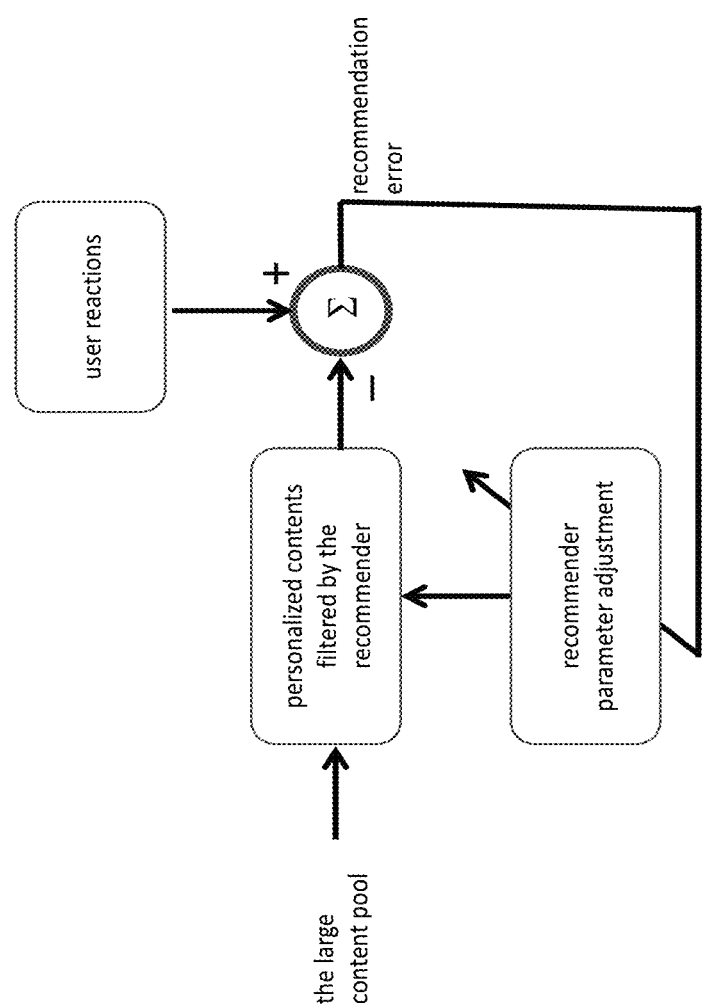
FIG. 14C shows a flow for calculating a set of recommender parameters to reduce recommendation error.

An optimum set of all the recommender parameters, such as the order of the SVD-based model reduction, can be calculated to minimize the recommendation error as depicted in a FIG. 14C.

User Recommendability

Recommendability of a user is a measure of how easy or hard it is to recommend a content to a given user. Since not all users are equally receptive to a recommended content, this approach assigns specific index to each user. We define Recommendability of user and use it to improve performance significantly. Most of the work in this area is based on rule of thumb that is gathered from generalized user data analysis and not much work is there to have fundamental limits.

Low recommendability may be caused by (i) Truly unpredictable taste, (ii) Lack of data: not enough users with similar ratings (new user).

Definition:

$$\rho_{ui}=E[r_{ui}-P(r_{ui})]^{-2}$$

where $\rho_{ui}$ is recommendability of user, i, E[.] is the expected value function, $r_{ui}$ is user reaction, P(.) is the predicted value.

Computation of $\rho_{ui}$ depends on the approach. For example, in one embodiment, in user based collaborative filtering, it may be calculated as:

sum of similarity of top N closet neighbor/N.

Recommendability can also be used to switch algorithms in parallel hybrid systems from content-based recommendation to collaborative filter based recommendation.

Using Neural Networks for Collaborative Filtering and User Connection

One way to formulate recommendation is based on a rectangular matrix containing Boolean values that indicate user ratings for items. This matrix is typically very sparse, i.e., most elements are zero. One way to reduce the matrix dimension is to use the SVD, which means the initial matrix A with r rows, c columns and rank m can be decomposed into the product of three matrices:

$$A=USV^T.$$

where the columns of U and V are orthonormal vectors that define the left and right singular vectors of A, and S is a diagonal matrix containing corresponding singular values. U is an m×c matrix and the singular vectors correspond to columns of the original matrix. V is an r×n matrix and the singular vectors correspond to rows of the original matrix. The singular values quantify the amount of variance in the original data captured by the singular vectors. This representation provides an ideal framework for dimensionality reduction, because one can quantify the amount of information that is lost if singular values and their corresponding singular vector elements are discarded. The smallest singular values are set to zero, reducing the dimensionality of the new data representation. The underlying intuition is that the n largest singular values together with their corresponding singular vector elements capture the important "latent" structure of the initial matrix, whereas random fluctuations are eliminated.

The usefulness of the SVD for matrix dimension reduction can be further explained by its geometric interpretation. If we choose to retain the k largest singular values, we can interpret the singular vectors, scaled by the singular values, as coordinates of points representing the rows and columns of the original matrix in k dimensions. In our context, the goal of this transformation is to find a spatial configuration such that items and user ratings are represented by points in k-dimensional space, where every item is placed at the centroid of every user rating that it received and every user rating is placed at the centroid of all the items that it was assigned to. While the position of vectors in this k-dimensional space is determined through the assignment of ratings to items, items can still be close in this space even without containing any common ratings.

To reduce dimensionality, for example, one can compute the SVD of the data and discard the n smallest singular values, reducing the dimensionality to k. For example, let k=0.9 m, where m is the rank of the initial matrix. The singular vectors of matrix U scaled by the remaining singular values represent rated items in k dimensions. These vectors become new training examples. Since we compute the SVD of the training data, resulting in real-valued feature vectors of size k, we need to specify how we transform examples to be classified into this format. We compute a k-dimensional vector for an item, so that with appropriate rescaling of the axes by the singular values, it is placed at the centroid of all the user ratings that it contains.

At this point we pick a learning algorithm that takes real-valued feature vectors as its input and learns a function that either predicts class membership or computes a score a user would assign to an item. Ideally, one should use a learning paradigm that allows for maximum flexibility in evaluating this task as either a regression or classification problem.

In one implementation we select artificial neural networks (NN) for this purpose. For example, a NN with k input units, 2 hidden units and 1 output unit can be used. The hidden units use sigmoid functions, while the output unit is linear. Weights are learned with backpropagation.

For NN weight updates, several different approaches can be used. For example, i) using a user's rating as the function value to predict, or ii) the average rating for an item and trained the network on the difference between a user's rating and the average rating. In order to predict scores for items, the output of the network needs to be added to the mean of the item. Depending on the rating scale of the domain, one can use a threshold to convert the predicted rating to a binary class label.

In this implementation, after the SVD is calculated and the reduced dimension representation of user reaction matrix A, U, S and V are found, basically a linear classification function has been reached to enable the recommendation engine computations. With the neural network, we're adding nonlinearity by using the SVD values as initial conditions for the neural network weights. An autoencoder type self-learning neural network can be used to add the requisite nonlinearity to improve the recommendation accuracy. One way to incorporate a neural network-based nonlinear classifier to an existing linear recommender is, for example, to start with an original user reaction matrix A of dimension r×c where r is number of rows (users) and c is the number of columns (contents); reduce its dimensions with an SVD-based ordering to size of m×n to yield a sufficient recommendation accuracy; then by using an autoencoder type self-learning network of size h (where h is the number of hidden nodes), expand the linear separation to nonlinear regions. For example, in one embodiment, these numbers are, r=2×10^4, c=6×10^5, m=45, n=85, h=600.

With these numbers, while the SVD-based linear classifier offers an average value of 70 percent recommendation accuracy, the neural network-based nonlinear classifier improves this value to a minimum of 87 percent level.

Another approach is to use neural network to recognize implicit patterns between user profiles and items of interest, which can then be further enhanced by collaborative filtering to personalized suggestions. In the hybrid combination of neural network and collaborative filtering algorithms, first a pseudo user-ratings vector for every user u in the database is generated. This pseudo user-ratings vector, $v_u$, consists of the item ratings provided by the user u, where available, and those predicted by the neural network predictor algorithm otherwise. A new $v_u$ can be formed as sum of $r_{u,i}$ and $c_{u,i}$, where $r_{u,i}$ denotes the actual rating provided by user u for item i, while $c_{u,i}$ is the rating predicted by the neural network system.

The pseudo user-ratings vectors of all users put together give the dense pseudo ratings matrix V. A collaborative filtering can be performed by on this dense matrix. The similarity between the active user a and another user u can be computed in many ways, including the Pearson correlation coefficient. Instead of the original user votes, the pseudo user-ratings vectors $v_a$ and $v_u$ based values can be used.

Figure 15:
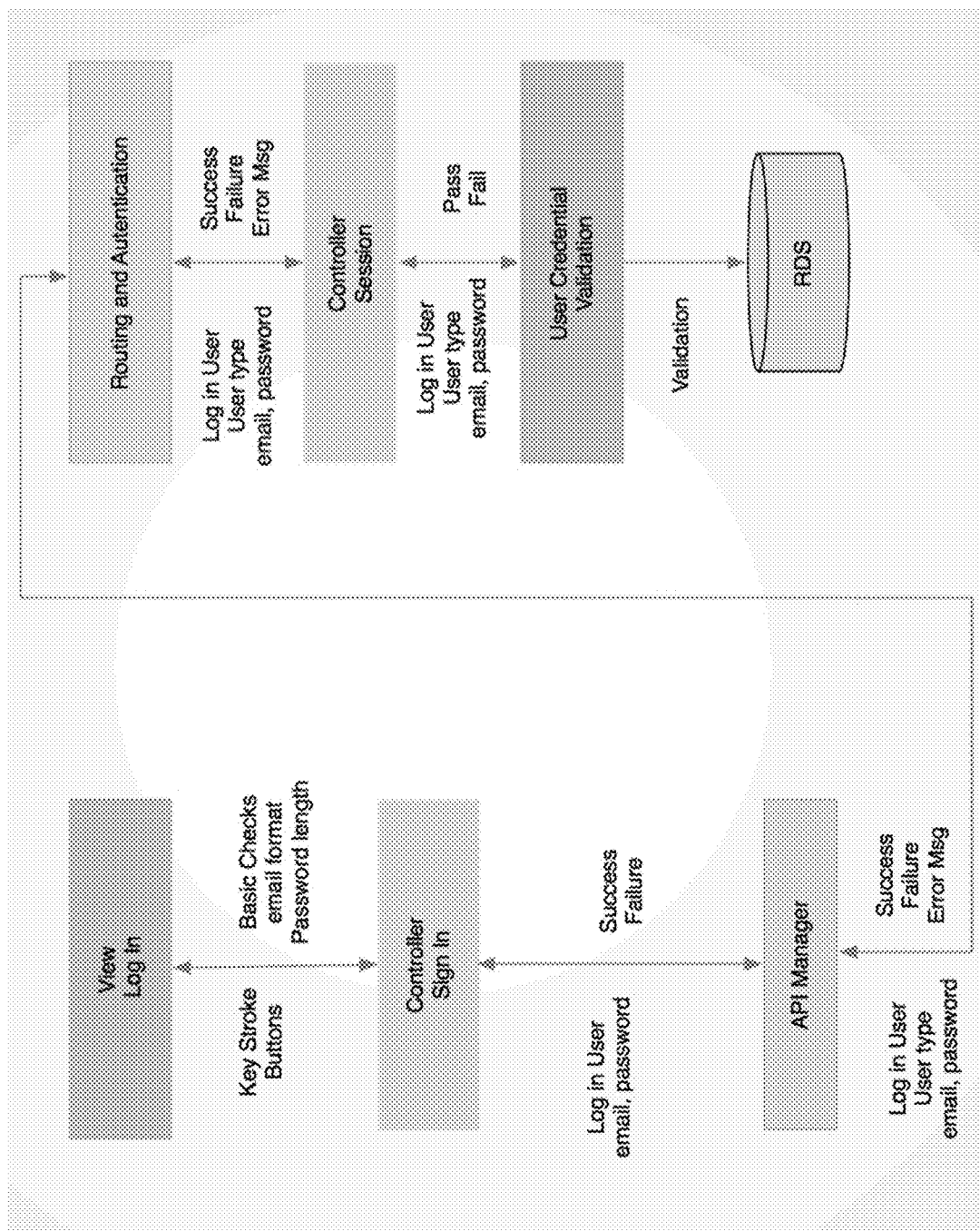
FIG. 15 shows the login function.
Figure 16:
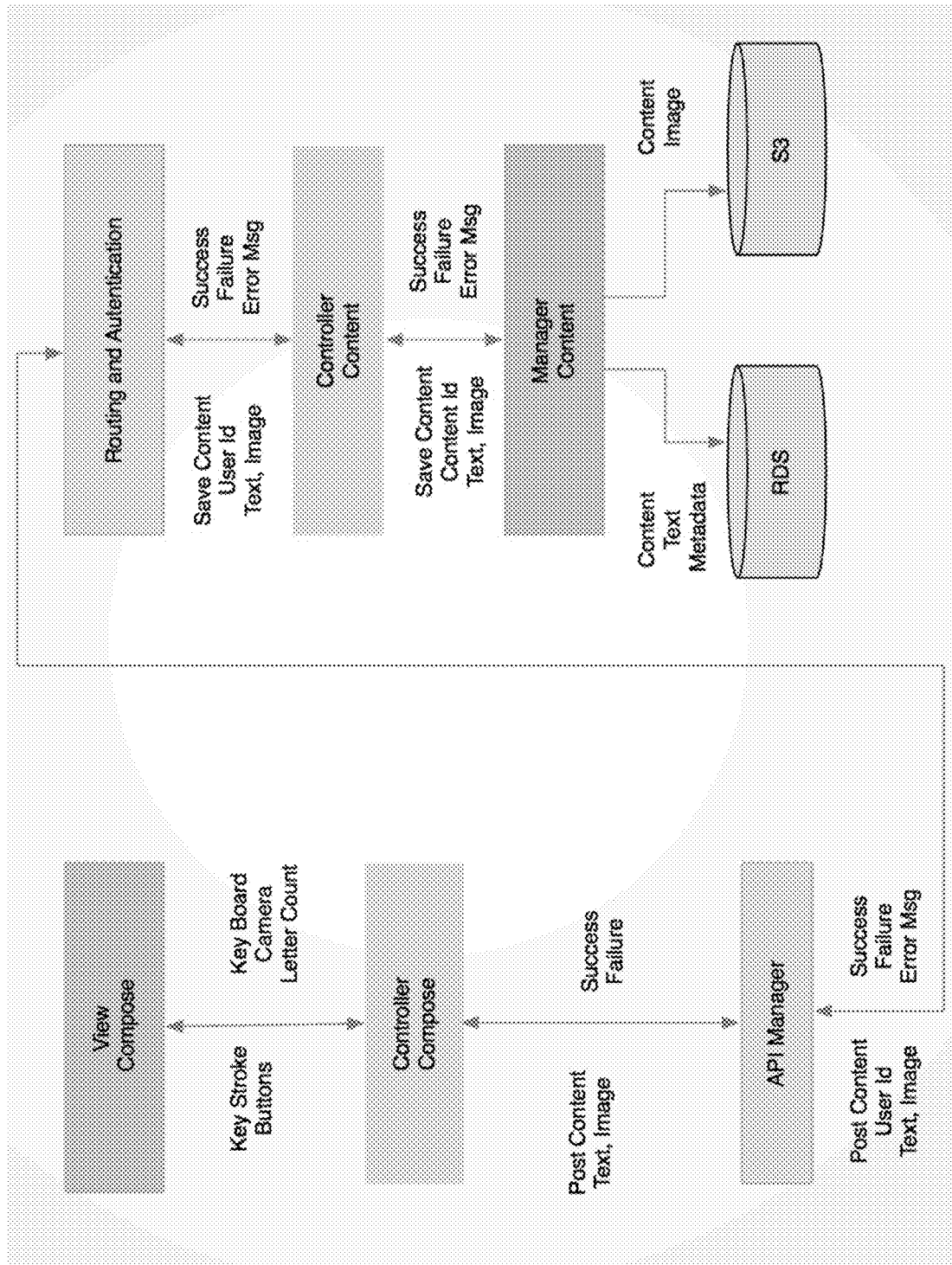
FIG. 16 shows the compose function.
Figure 17:
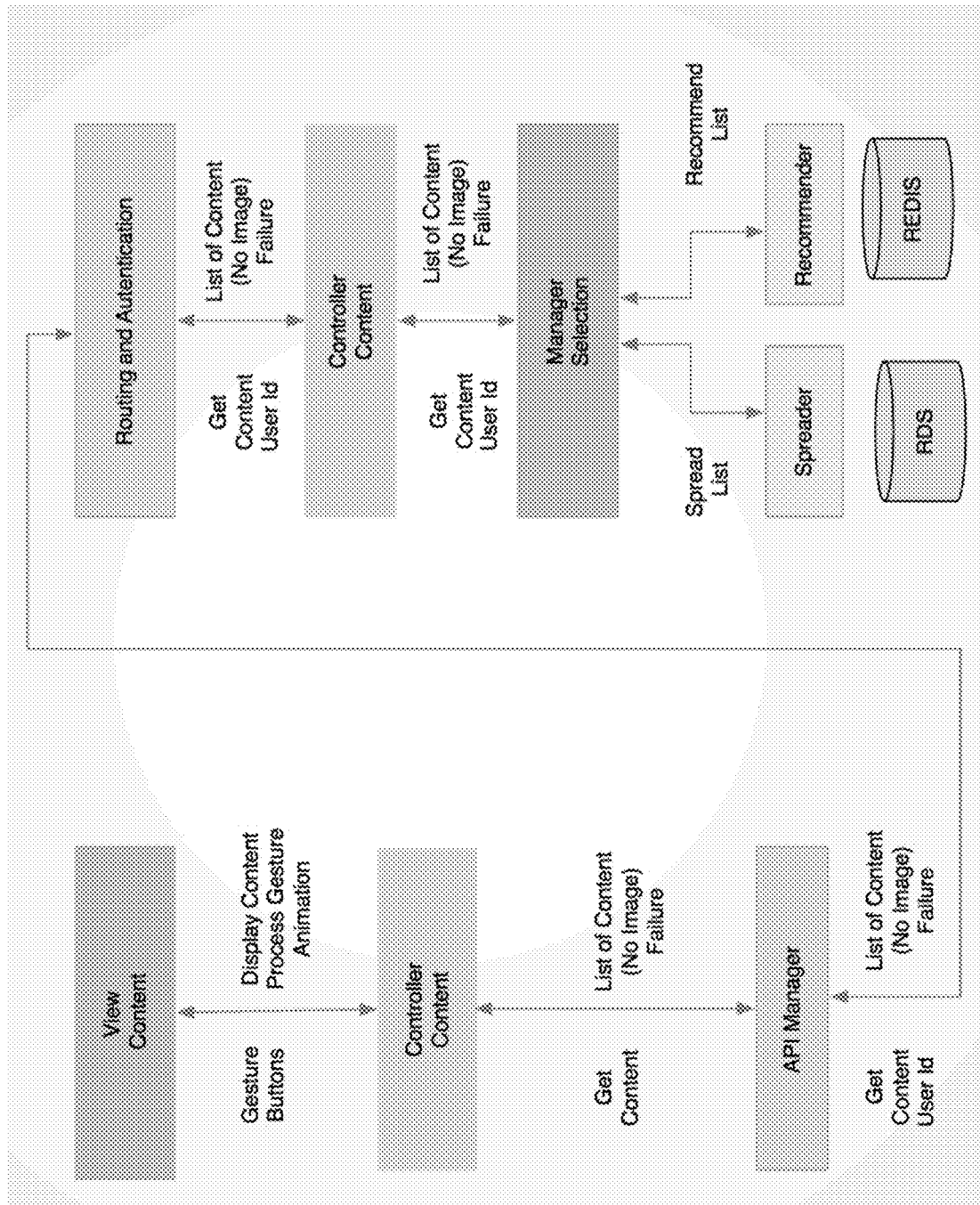
FIG. 17 shows the get content function.
Figure 18:
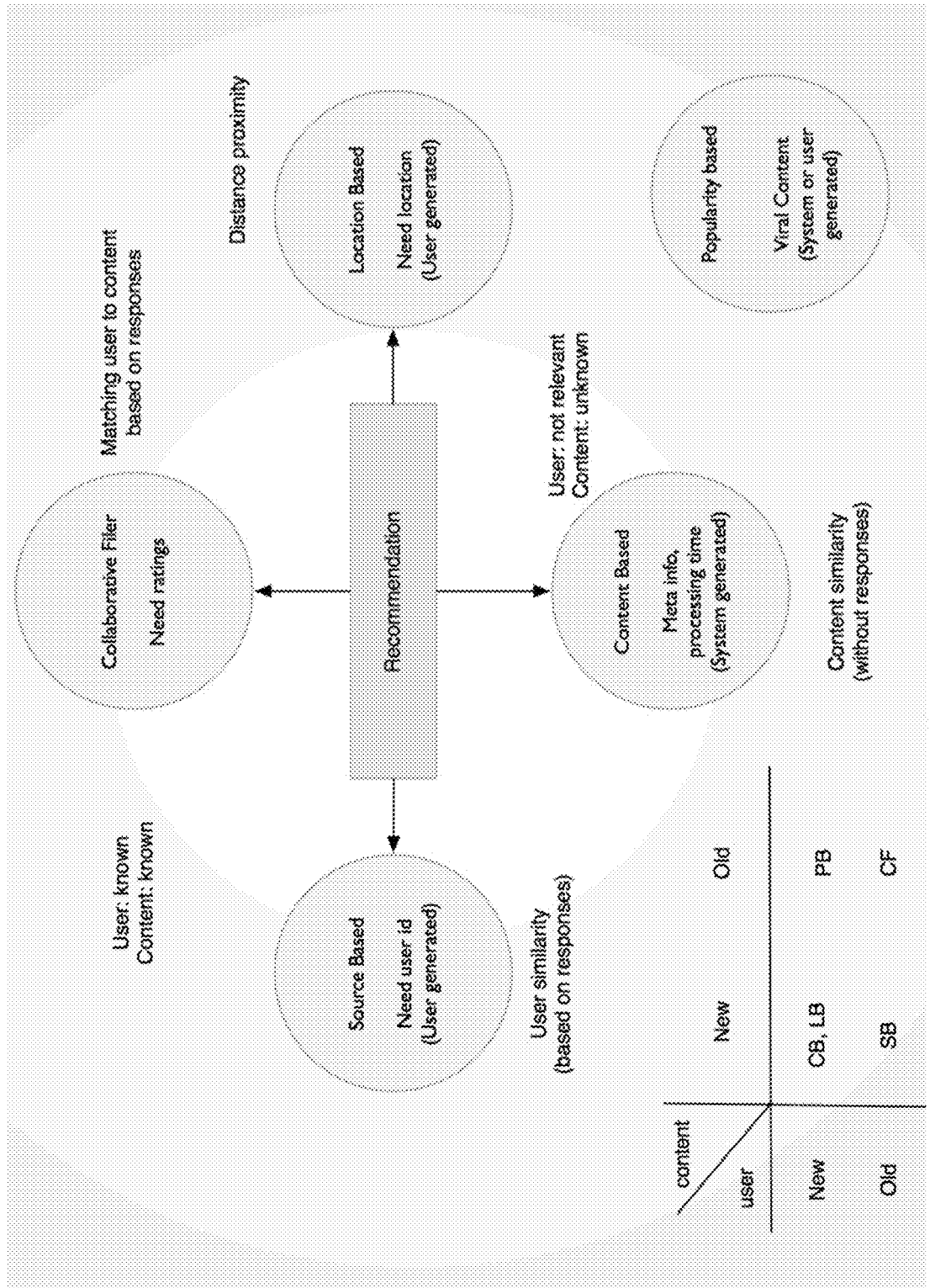
FIG. 18 shows the content selection.
Figure 19:
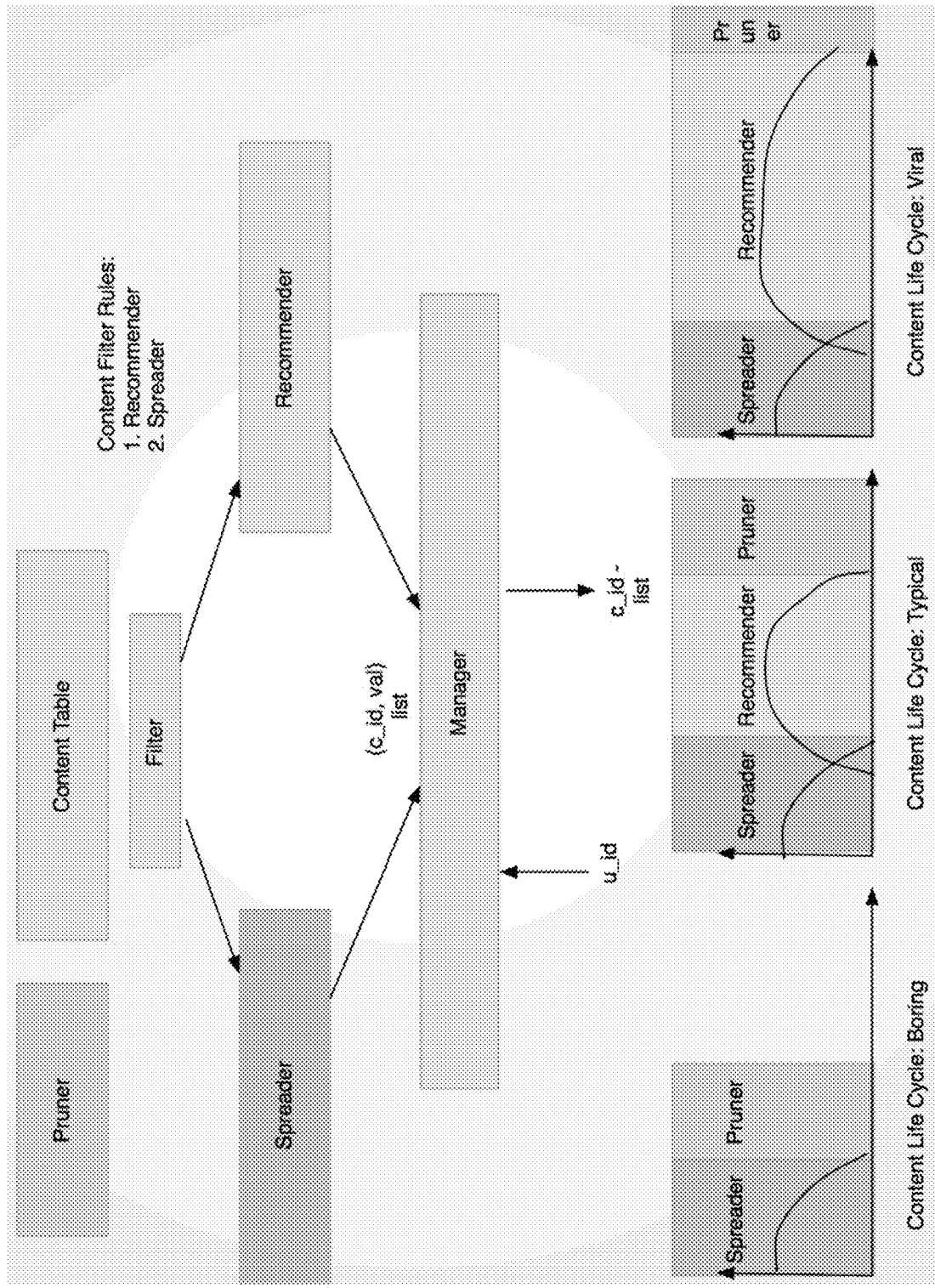
FIG. 19 shows the content life cycle.

FIG. 15 shows the login function.
FIG. 16 shows the compose function.
FIG. 17 shows the get content function.
FIG. 18 shows the content selection.
FIG. 19 shows the content life cycle.

Typical Implementation

Two real life-like platforms are implemented as user interface (Cafe and Party environments). To facilitate interactions with other users such as exchanging and discussing information, direct and group conversations and playing games, by offering certain features that gives an impression the user is in a real Cafe or Party scene, such as chatting around a table, fireplace, rooftop, etc; talking to a new person recommended by the app as if the new person is being invited to sit nearby scanning the conversations around the user either by swiping or moving the device.

To allow users to communicate with the ones who are interested in participating, by offering certain algorithms. The new algorithms are designed to determine "like-minded" individuals and makes introduction.

Figure 20:
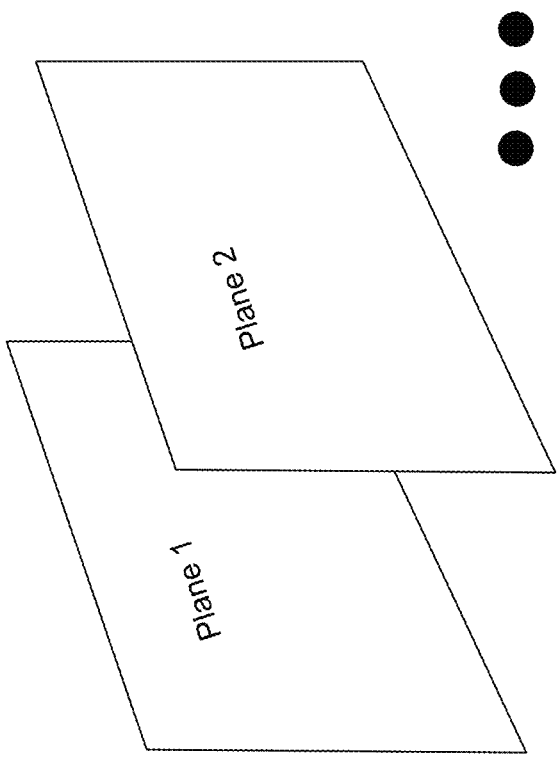
FIG. 20 shows 3D Cafe visualization effect by using several layers of background images.

FIG. 20 shows 3D Cafe visualization effect by using several layers of background images.

As users swipe contents on the main page, images on the plane 1, 2, ... , n move at speeds s1, s1, ... sn, where s1< s2< ... <sn, so that users get a more realistic multidimensional impression of actually being in a coffee shop or in a crowded party house.

The following two embodiments are examples of how the above mentioned fundamentals can be implemented in practical forms.

One example, called Cafe, uses techniques here to let its users discover new content, make connections with like-minded individuals as well as spread their messages to users who are interested. The message spreading mechanism and the look of the app implies "word of mouth" or WoM communication.

The product uses a theme typical of a cafe scene where individuals get together to chat. The size of the cafe house is the entire world. Specific pages demonstrating how this interaction is made possible are as follows.

FIG. 21 shows the Cafe Scene app, main view.
FIG. 22 shows the Cafe Scene app, compose view.
FIG. 23 shows the Cafe Scene app, comment view.
FIG. 24 shows the Cafe Scene app, profile view.

Another example, called House Party, uses these techniques to let its users interact with each other in a house party fashion. The product offers its users a house party atmosphere where they can interact through their contents, meet other like-minded individuals and entertain by participating in several activities. The size of the house is the entire world; therefore, this is a global house party. The forms of entertainment includes, for example:

1. Fireplace chat: communication between two individuals.
2. Pool party chat: communication among a group of individuals.
3. Backyard chat: communication among a group of individuals.
4. Dancing floor: participating in a song with certain moves from all around the world
5. Music: listening to music provided by other users or other sources, enjoyed by like-minded users having similar tastes.

The product can also facilitate or initiate physical or remote interactions between two users in a dating fashion. The requisite tools to facilitate such relation re included in the product and some examples are shown below.

Figure 27:
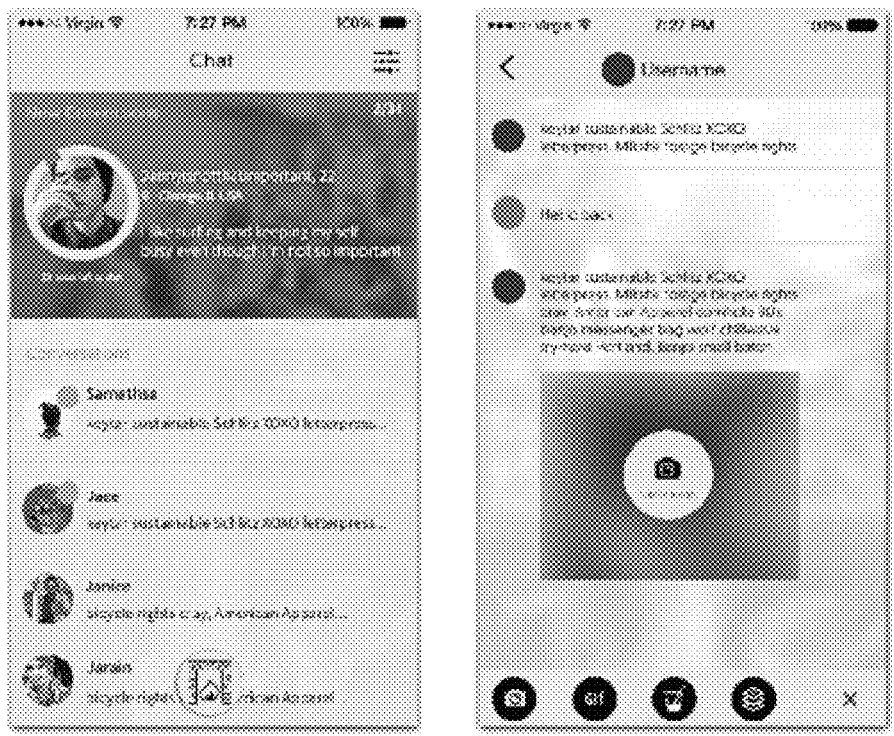
FIG. 27 shows the House Party app, chat view.
Figure 28:
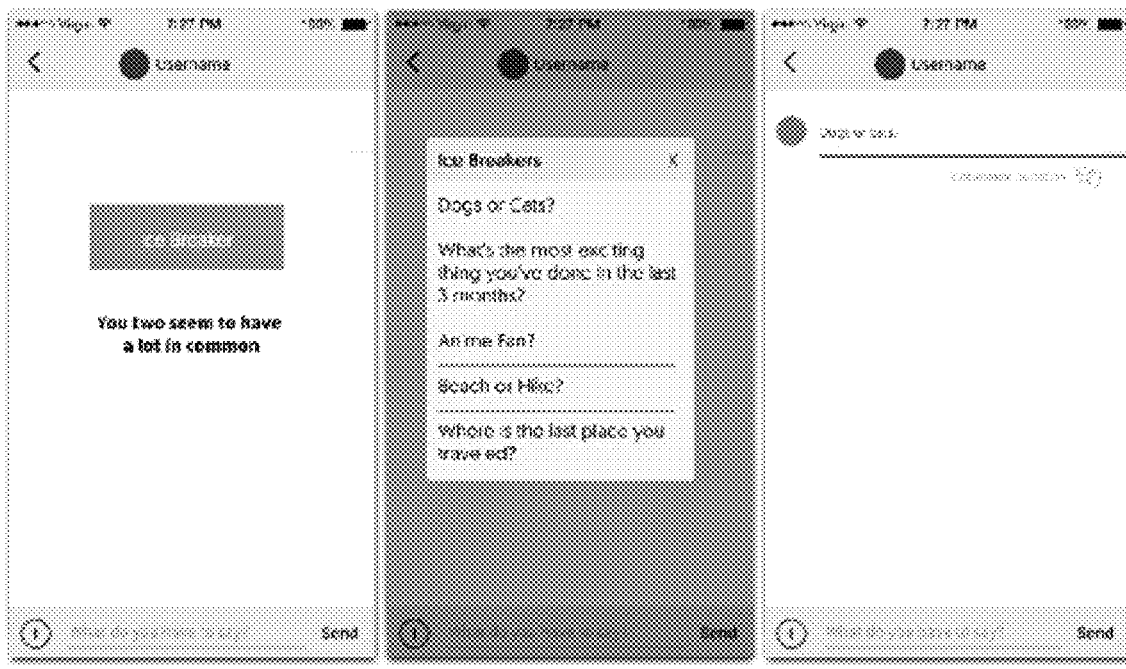
FIG. 28 shows the House Party app, chat initiation view.
Figure 29:
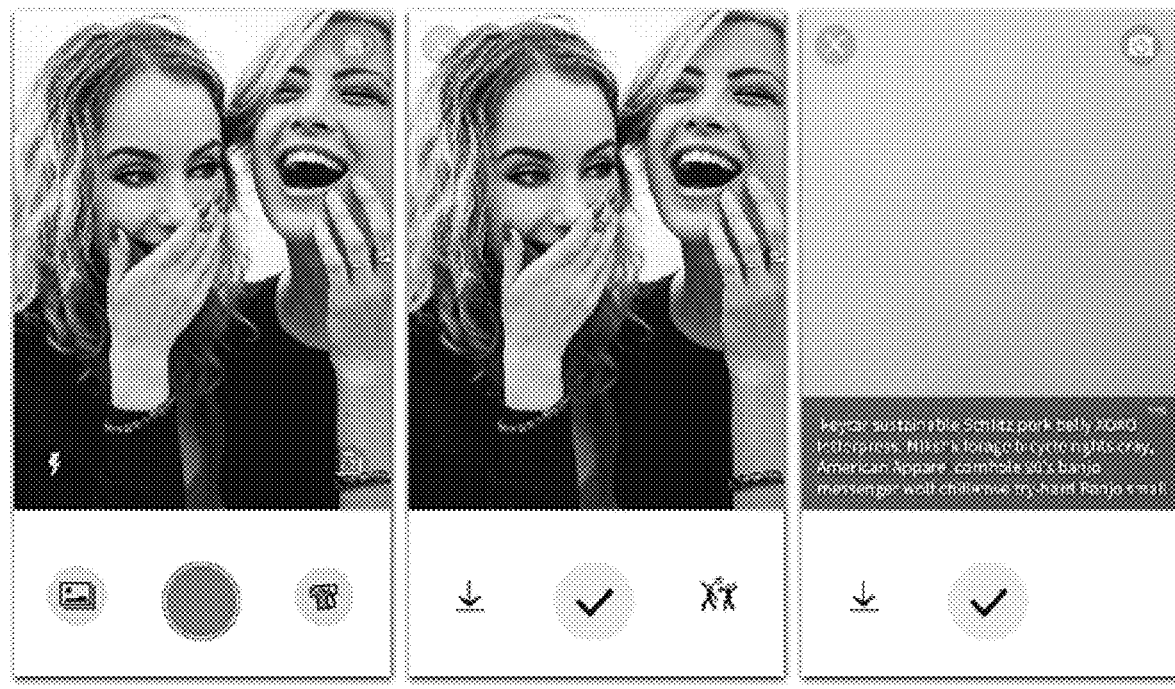
FIG. 29 shows the House Party app, compose view.
Figure 30:
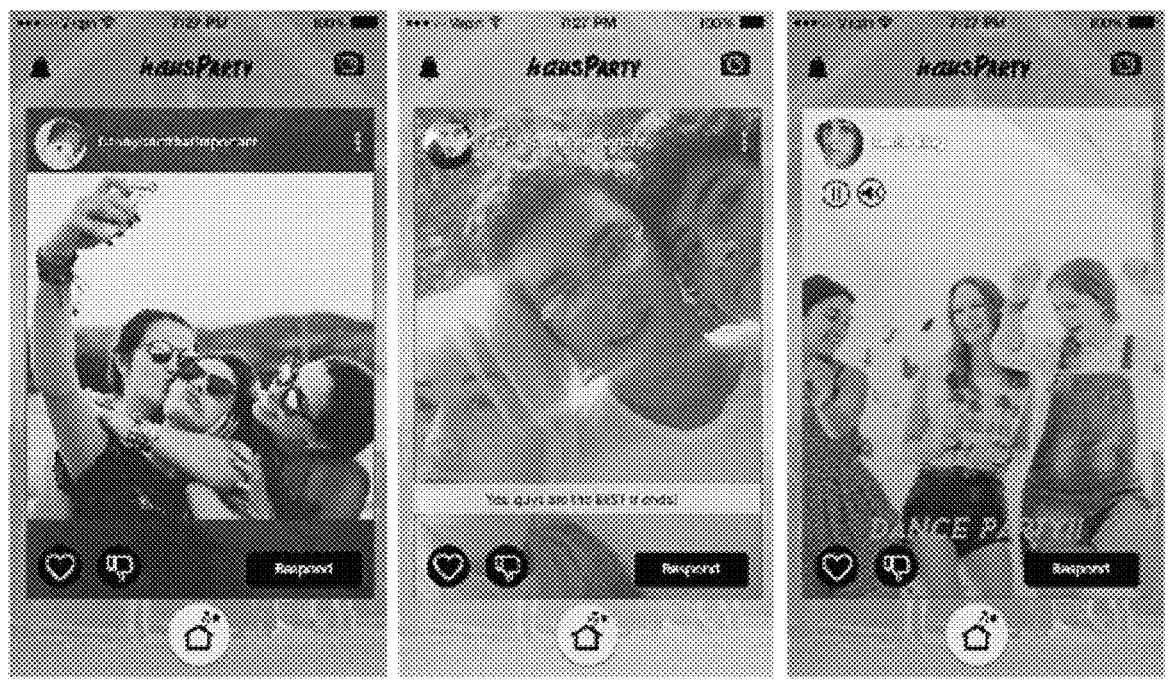
FIG. 30 shows the House Party app, types of content.

FIG. 25 shows the House Party app, main view.
FIG. 26 shows the House Party app, comment view.
FIG. 27 shows the House Party app, chat view.
FIG. 28 shows the House Party app, chat initiation view.
FIG. 29 shows the House Party app, compose view.
FIG. 30 shows the House Party app, the types of content.

Using standard smartphone gestures or a very simple and intuitive looking navigation button can be utilized to do the navigation between each room in the party house. Each room has its own distinctive features and characters so that the app does not appear confusing to a user. One other implementation is shown in FIGS. 23-28.

Figure 31:
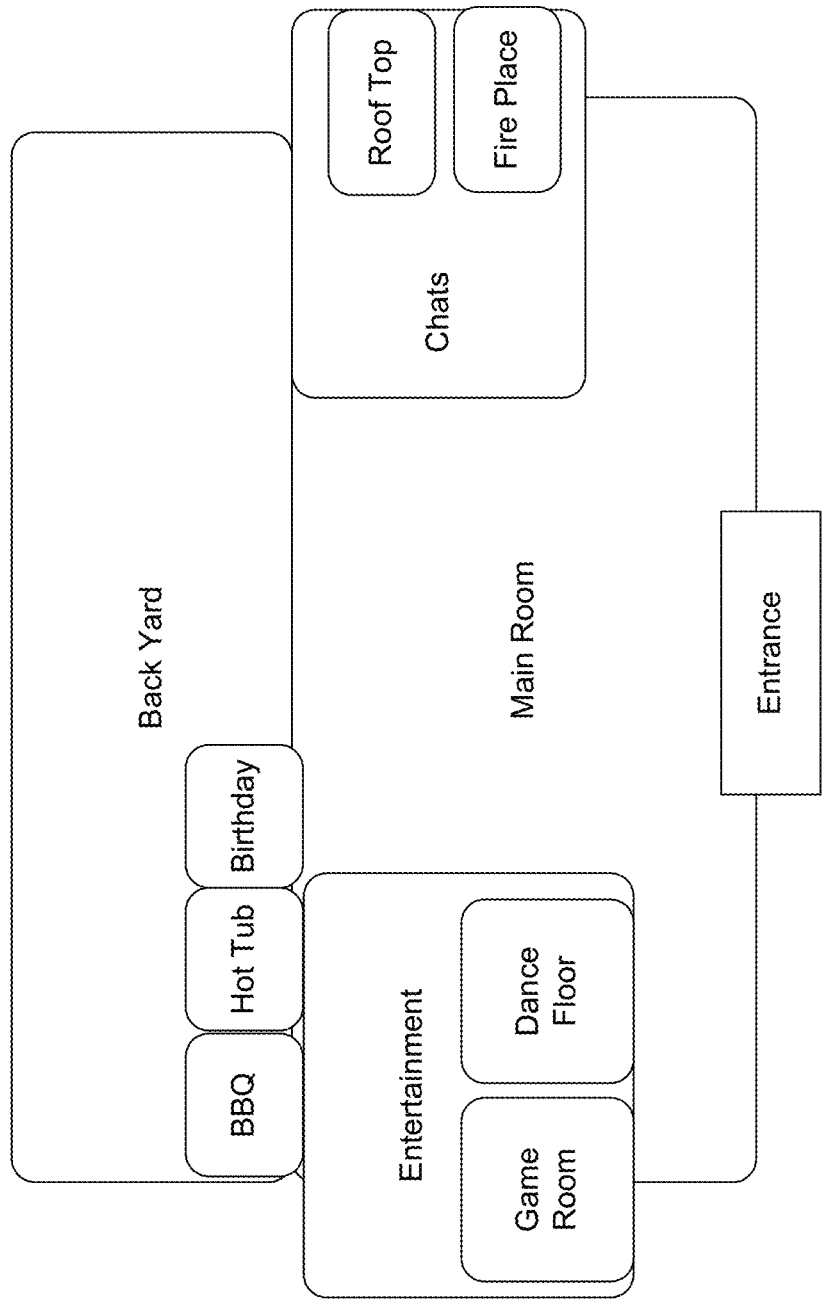
FIG. 31 shows the House Party app, the main room.
Figure 32:
FIG. 32 shows screenshots demonstrating a user interface (UI).

FIG. 31 shows House Party app where users navigate inside the house depending on the activity they prefer.
FIG. 32 shows screenshots demonstrating a user interface (UI).

Both the main room in the house as well as the main room in Cafe is designed such that user's present screen displays Part A and as the user scrolls horizontally left or right, the background images (part B and C) also move left and right to create an impression that the user is turning his/her head and engaging in conversations around. Similarly, instead of scrolling the image with fingers, users have option to move the device left and right and the app, by using the position sensors in the device, detects the motion and moves the entire screen accordingly.

Figure 33:
FIG. 33 shows the House Party app, the main room.
Figure 34:
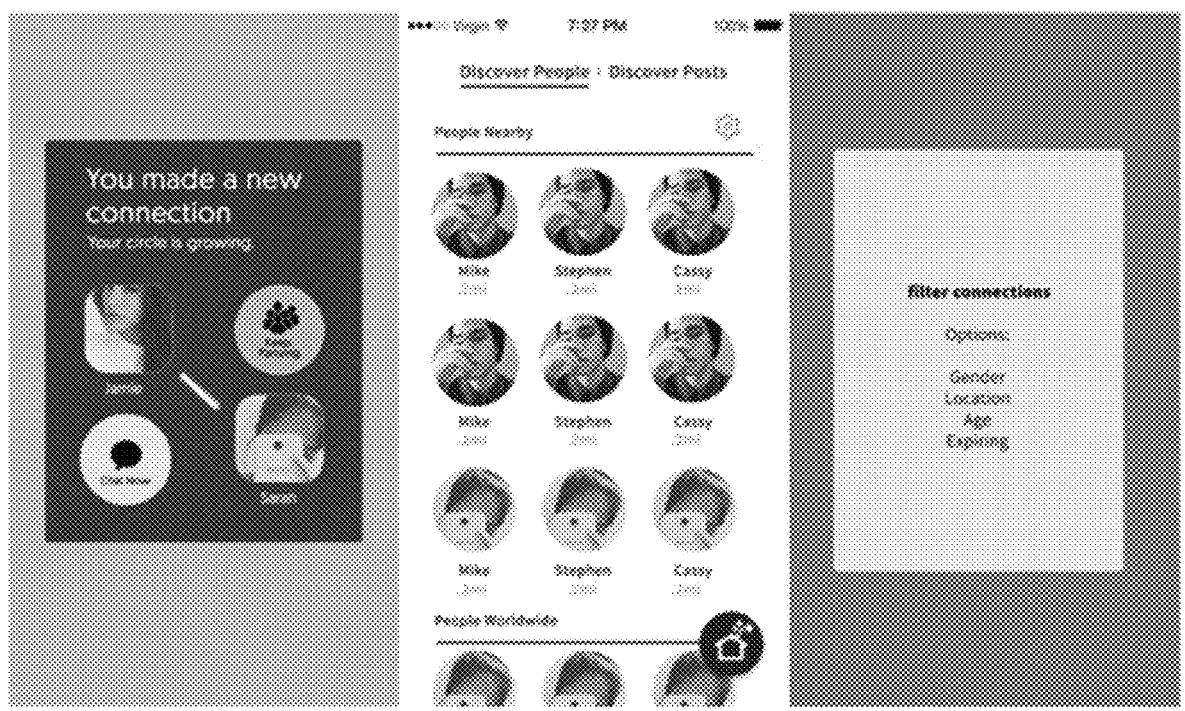
FIG. 34 shows screenshots demonstrating a user interface (UI).
Figure 35:
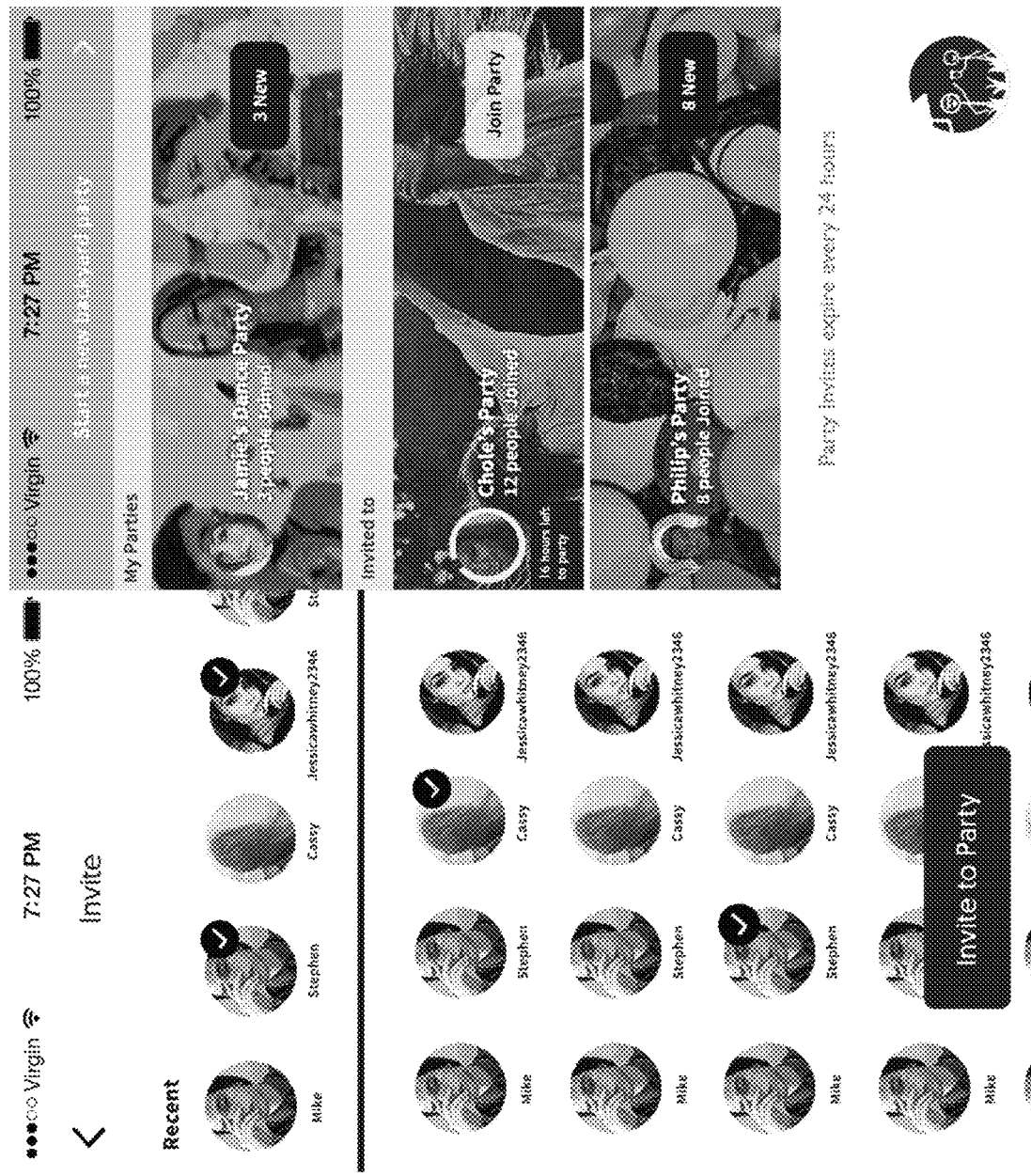
FIG. 35 shows the House Party app, the backyard.
Figure 36:
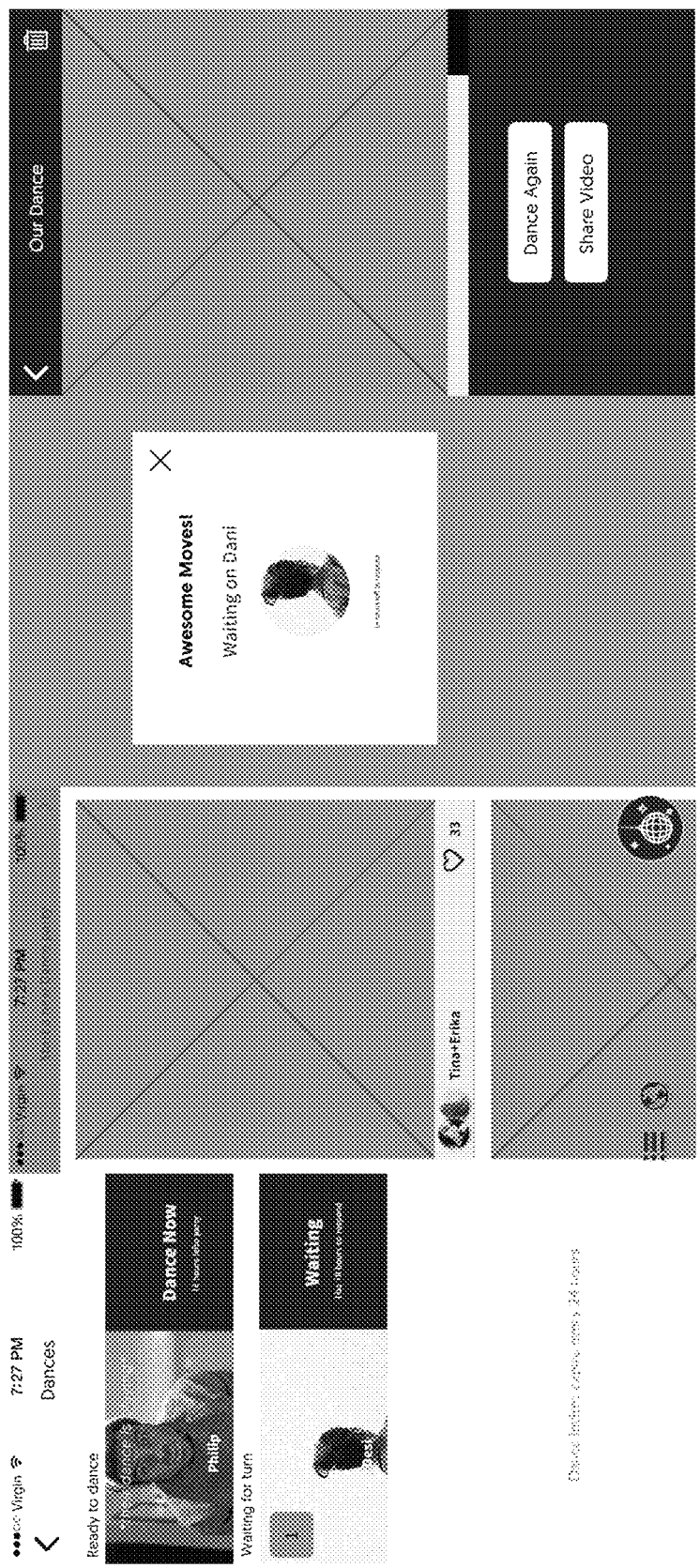
FIG. 36 shows the House Party app, the dance floor.
Figure 37:
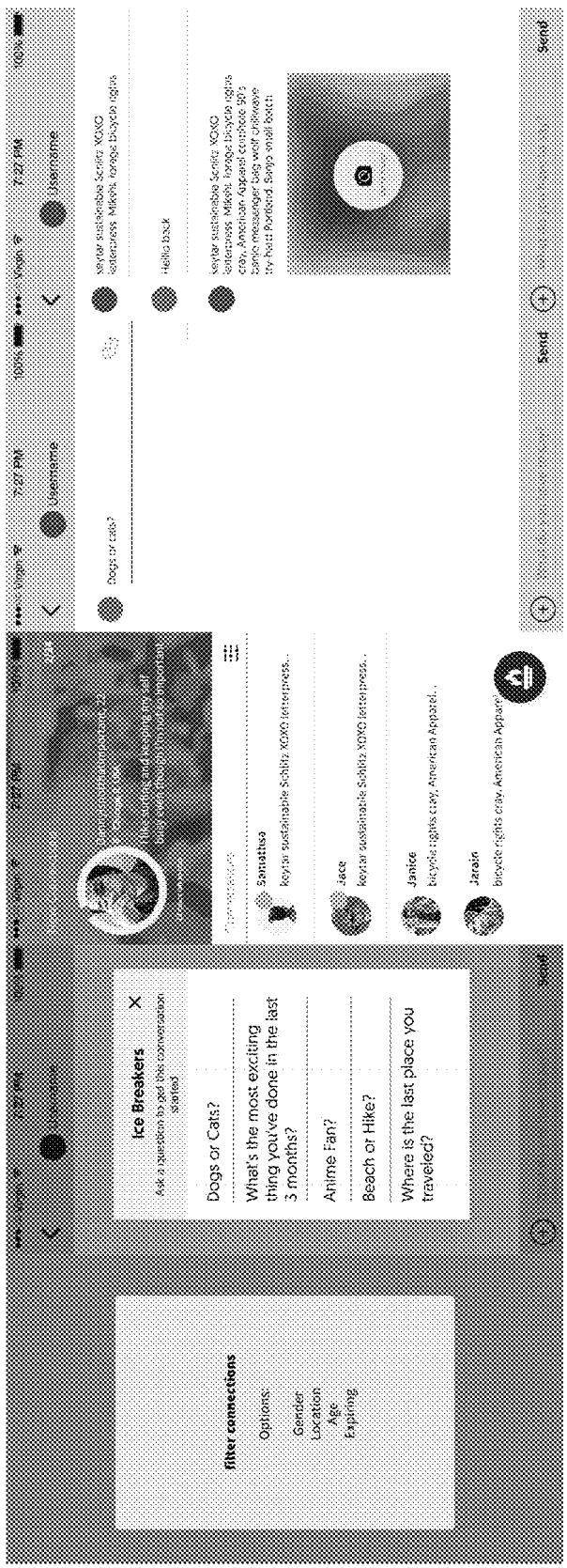
FIG. 37 shows the House Party app, the fireplace.
Figure 38:
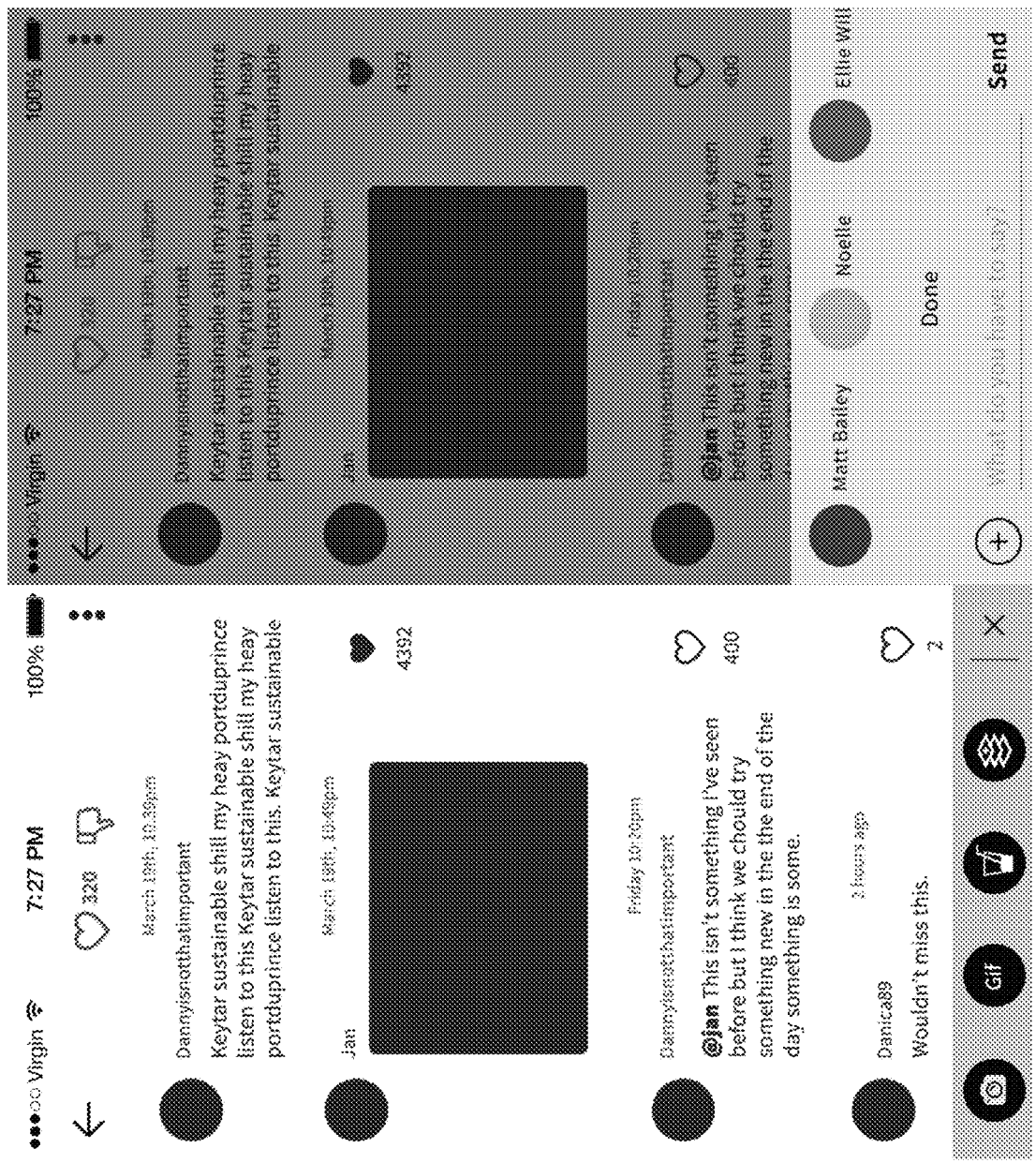
FIG. 38 shows the House Party app, the comments.
Figure 39:
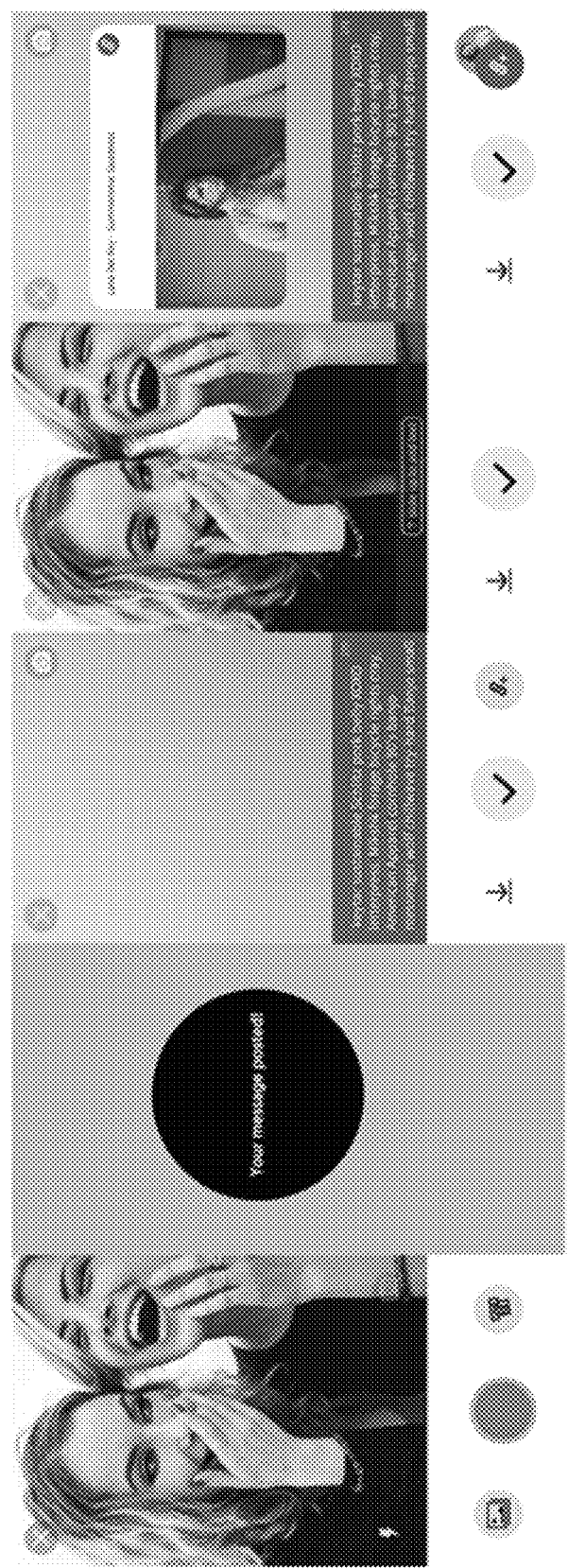
FIG. 39 shows the House Party app, composing a message.
Figure 40:
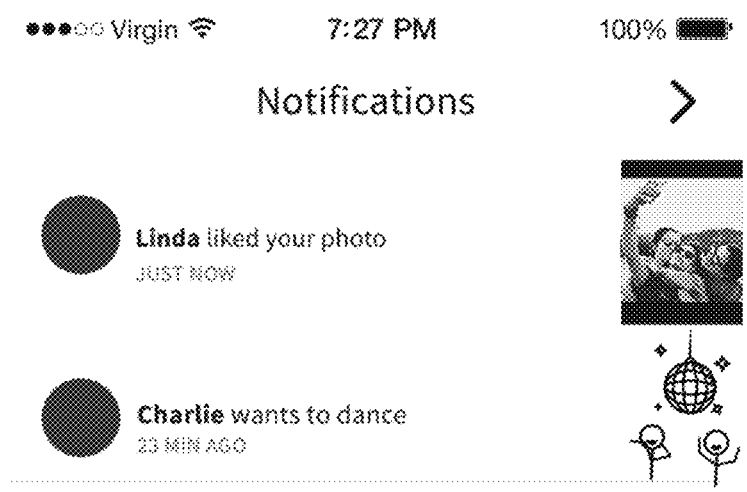
FIG. 40 shows the House Party app, notifications.

FIG. 33 shows the House Party app, the main room.
FIG. 34 shows the House Party app, the main room.
FIG. 35 shows the House Party app, the backyard.
FIG. 36 shows the House Party app, the dance floor.
FIG. 37 shows the House Party app, the fireplace.
FIG. 38 shows the House Party app, the comments.
FIG. 39 shows the House Party app, composing a message.
FIG. 40 shows the House Party app, notifications.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising: providing a social graph, wherein the social graph comprises:
a first type of node, referred to as a user-provided node, a first type of edge, referred to as a user-provided edge; and
a second type of edge, referred to as a system-provided edge;
using at least one electronic processor, managing the social graph comprising:
creating a user-provided node for each user of a system comprising the social graph;
allowing a first user-provided node for a first user to become coupled a second user-provided node for a second user via a first user-provided edge;
allowing the first and second users to view the first user-provided edge;
providing a third user-provided node for a third user;
monitoring first content contributed by the first user-provided node, second content contributed by the second user-provided node, and third content contributed by the third user-provided node in an online social platform represented by the social graph;
monitoring first feedback by others to the first content contributed by the first user-provided node, monitoring second feedback by others to the second content contributed by the second user-provided node, and monitoring third feedback by others to the third content contributed by the third user-provided node;
from the monitored first content and first feedback by others to the first user-provided node, generating a first rating vector for the first user-provided node;
from the monitored second content and second feedback by others for the second user-provided node, generating a second rating vector for the second user-provided node;
from the monitored third content and the third feedback by others for the third user-provided node, generating a third rating vector for the third user-provided node;
determining a first similarity factor between the first user-provided node and the third user-provided node, wherein the determination comprises a computation of a cosine of the first rating vector and the third rating vector;
determining a second similarity factor between the second user-provided node and the third user-provided node, wherein the determination comprises a computation of a cosine of the second rating vector and the third rating vector;
based on the first similarity factor, coupling the first user-provided node to the third user-provided node via a first system-provided edge, wherein the first user and third user are members of a first colony group of the social graph;
based on the second similarity factor, not coupling the second user-provided node to the third user-provided node via a system-provided edge, wherein the third user is not a member of the first colony group of the social graph;
disallowing the first and third users from being able to view the first system-provided edge; and
displaying to the first user other users that are coupled to the first user via user-provided edges but not system-provided edges.

2. The method of claim 1 wherein via the first user-provided edge, the first user-provided node is separated by one degree of separation from the second user-provided node.

3. The method of claim 1 wherein the managing the social graph comprises:
allowing the second user-provided node, to become coupled to a fourth user-provided node for a fourth user via a first and second user-provided edges, wherein via the second user-provided edge, the first user-provided node is separated by two degrees of separation from the fourth user-provided node.

4. The method of claim 1 comprising:
delivering a first informational content to a first colony group of the social graph, wherein the first colony group comprises user-provided nodes coupled together via the first system-provided edge, which includes the first and third user-provided nodes.

5. The method of claim 4 comprising:
disallowing delivering of the first informational content to the second user-provided node, which is not coupled to the first system-provided edge.

6. The method of claim 1 wherein the managing the social graph comprises: allowing the second user-provided node to become coupled to a fourth user-provided node for a fourth user via a second system-provided edge.

7. The method of claim 6 comprising: delivering a first informational content to the first colony group of the social graph, wherein the first colony group comprises user-provided nodes coupled together via the first system-provided edge, which includes the first and third user-provided nodes; and delivering a second informational content to a second colony group of the social graph, wherein the second colony group comprises user-provided nodes coupled together via the second system-provided edge, which includes the second and fourth user-provided nodes.

8. The method of claim 7 wherein the first informational content is not delivered to the fourth user-provided node, and the second informational content is not delivered to the third user-provided node.

9. The method of claim 1 wherein the system creates the first user-provided edge because the first user indicated a connection to the second user.

10. The method of claim 1 wherein the system creates the first system-provided edge although the first user had not indicated any connection to the third user.

11. The method of claim 9 wherein the system creates the first system-provided edge although the first user had not indicated any connection to the third user.

12. A system comprising:
a first mobile device, wherein the first mobile device comprises a touchscreen and a wireless transceiver;
a software application program, comprising code executable on a processor of the first mobile device, wherein the software application program comprises:
code to cause the wireless transceiver to connect and access to a social network, wherein the social network comprises:
a first type of node, referred to as a user-provided node, a first type of edge, referred to as a user-provided edge;
and a second type of edge, referred to as a system-provided edge, and the social network is managed comprising:
creating a user-provided node for each user of a system comprising the social graph;

allowing a first user-provided node for a first user to become coupled a second user-provided node for a second user via a first user-provided edge;

allowing the first and second users to view the first user-provided edge;

providing a third user-provided node for a third user;

monitoring first content contributed by the first user-provided node, second content contributed by the second user-provided node, and third content contributed by the third user-provided node in an online social platform represented by the social graph;

monitoring first feedback by others to the first content contributed by the first user-provided node, monitoring second feedback by others to the second content contributed by the second user-provided node, and monitoring third feedback by others to the third content contributed by the third user-provided node;

from the monitored first content and first feedback by others to the first user-provided node, generating a first rating vector for the first user-provided node;

from the monitored second content and second feedback by others for the second user-provided node, generating a second rating vector for the second user-provided node;

from the monitored third content and the third feedback by others for the third user-provided node, generating a third rating vector for the third user-provided node;

determining a first similarity factor between the first user-provided node and the third user-provided node, wherein the determination comprises a computation of a cosine of the first rating vector and the third rating vector;

determining a second similarity factor between the second user-provided node and the third user-provided node, wherein the determination comprises a computation of a cosine of the second rating vector and the third rating vector;

based on the first similarity factor, coupling the first user-provided node to the third user-provided node via a first system-provided edge, wherein the first user and third user are members of a first colony group of the social graph;

based on the second similarity factor, not coupling the second user-provided node to the third user-provided node via a system-provided edge, wherein the third user is not a member of the first colony group of the social graph; and disallowing the first and third users from being able to view the first system-provided edge;

code to generate a first touch interactive screen for a first user of the first mobile device comprising a picture of second user of a social network, wherein the second user is coupled to the first user via a user-provided edge;

code to generate a second touch interactive screen for the first user of the first mobile device comprising a picture of the third user of a social network, wherein the third user is coupled to the first user via a system-provided edge;

code to generate a third touch interactive screen to allow the first user to select from a list of system-generated ice breaker questions to send to the third user; and code to generate a fourth touch interactive screen to the first user to start a party and invite one or more other users of the social network, including the third user, to the party.

13. The system of claim 12 comprising:

a second mobile device, wherein the second mobile device comprises a touchscreen and a wireless transceiver;

a software application program, comprising code executable on a processor of the second mobile device, wherein the software application program comprises:

code to generate a fifth touch interactive screen for the third user of the second mobile device comprising a first informational content for the first colony group of the social graph, wherein the first colony group comprises user-provided nodes coupled together via the first system-provided edge, which includes the first and third user-provided nodes.

14. The system of claim 12 wherein the system creates the first system-provided edge although the first user had not indicated any connection to the third user.

15. The system of claim 14 wherein the system creates the first user-provided edge because the first user indicated a connection to the second user.

* * * * *